(12) United States Patent
Sauer et al.

(10) Patent No.: US 7,902,687 B2
(45) Date of Patent: Mar. 8, 2011

(54) SUBMERSIBLE TURBINE-GENERATOR UNIT FOR OCEAN AND TIDAL CURRENTS

(75) Inventors: Christopher R. Sauer, Tampa, FL (US); Charles D. Syverson, North Mankato, MN (US); Patrick McGinnis, Jenkintown, PA (US)

(73) Assignee: Ocean Renewable Power Company, LLC, Portland, ME (US)

( * ) Notice: Subject to any disclaimer, the term of this patent is extended or adjusted under 35 U.S.C. 154(b) by 240 days.

(21) Appl. No.: 11/975,581

(22) Filed: Oct. 19, 2007

(65) Prior Publication Data
US 2009/0309365 A1 Dec. 17, 2009

Related U.S. Application Data

(60) Provisional application No. 60/853,028, filed on Oct. 20, 2006.

(51) Int. Cl.
*F03B 7/00* (2006.01)
(52) U.S. Cl. .............................................. 290/54; 415/7
(58) Field of Classification Search ..................... 290/54
See application file for complete search history.

(56) References Cited

U.S. PATENT DOCUMENTS

| | | | |
|---|---|---|---|
| 707,857 A * | 8/1902 | Marburg | 416/85 |
| 0,958,599 A | 5/1910 | Cooksey | |
| 1,835,018 A | 12/1931 | Darrieus | |
| 1,987,065 A | 1/1935 | Karl | |
| 1,989,349 A | 1/1935 | Coberly | |
| 2,106,928 A | 2/1938 | Lee | |
| 2,782,321 A * | 2/1957 | Fischer | 290/4 R |
| 3,542,483 A | 11/1970 | Gagliardi | |
| 3,980,894 A | 9/1976 | Vary et al. | |
| 3,986,787 A | 10/1976 | Moulton, Jr. et al. | |
| 3,993,913 A * | 11/1976 | Dickman | 290/53 |
| 4,012,163 A | 3/1977 | Baumgartner | |
| 4,084,918 A | 4/1978 | Pavlecka | |
| 4,134,707 A | 1/1979 | Ewers | |
| 4,237,384 A | 12/1980 | Kennon | |
| 4,412,417 A | 11/1983 | Dementhon | |
| 4,555,218 A | 11/1985 | Jonsson et al. | |
| 4,717,832 A * | 1/1988 | Harris | 290/43 |
| 4,748,808 A * | 6/1988 | Hill | 60/398 |
| 5,405,246 A | 4/1995 | Goldberg | |

(Continued)

FOREIGN PATENT DOCUMENTS

DE 2948060 6/1981

(Continued)

*Primary Examiner* — Joseph Waks
(74) *Attorney, Agent, or Firm* — Kevin M. Farrell; Katherine A. Wrobel; Pierce Atwood LLP

(57) ABSTRACT

A submersible turbine-generator unit includes two or more turbines mounted on a common shaft with a generator therebetween. Each such turbine is capable of providing relatively low-speed, unidirectional rotation under a reversible ultra low head pressure and/or low velocity fluid flow. A plurality of airfoil-shaped turbine blades mount parallel to the common shaft and transversely to the direction of fluid flow for rotation in a plane parallel to the fluid flow. The turbines convert energy in the waterway currents into mechanical energy that will transfer through the turbine shaft to a cylindrical permanent magnet generator which will convert mechanical energy in the form of RPM and torque into electricity. Electricity from the variable speed electric generator is controlled, synchronized, conditioned and transformed into utility-grade electricity using a power electronics system in each module.

17 Claims, 28 Drawing Sheets

U.S. PATENT DOCUMENTS

| | | |
|---|---|---|
| 5,451,137 A | 9/1995 | Gorlov |
| 5,451,138 A | 9/1995 | Istorik et al. |
| 5,499,904 A | 3/1996 | Wallace et al. |
| 5,577,882 A | 11/1996 | Istorik et al. |
| 5,642,984 A * | 7/1997 | Gorlov ............ 416/176 |
| 5,720,597 A | 2/1998 | Wang et al. |
| 5,834,853 A * | 11/1998 | Ruiz et al. ......... 290/54 |
| 6,036,443 A * | 3/2000 | Gorlov ............ 416/176 |
| 6,155,892 A | 12/2000 | Gorlov |
| 6,253,700 B1 | 7/2001 | Gorlov |
| 6,293,835 B2 | 9/2001 | Gorlov |
| 6,531,788 B2 | 3/2003 | Robson |
| 6,881,347 B2 | 4/2005 | Jansen et al. |
| 6,955,049 B2 | 10/2005 | Krouse |
| 6,962,054 B1 | 11/2005 | Linney et al. |
| 7,156,609 B2 | 1/2007 | Palley |
| 7,257,946 B2 | 8/2007 | Welch, Jr. |
| 7,318,702 B2 * | 1/2008 | Budi ............ 416/142 |
| 7,352,074 B1 * | 4/2008 | Pas ............ 290/43 |
| 7,586,209 B1 * | 9/2009 | Lyatkher ............ 290/54 |
| 7,661,922 B2 * | 2/2010 | Belinsky ............ 415/4.3 |
| 2001/0001299 A1 * | 5/2001 | Gorlov ............ 440/8 |
| 2002/0197148 A1 * | 12/2002 | Belinsky ............ 415/2.1 |
| 2008/0023963 A1 * | 1/2008 | Perich ............ 290/52 |
| 2009/0085356 A1 * | 4/2009 | Lyatkher ............ 290/52 |
| 2009/0091134 A1 * | 4/2009 | Lyatkher ............ 290/54 |
| 2009/0194997 A1 * | 8/2009 | Stabins ............ 290/54 |

FOREIGN PATENT DOCUMENTS

| | | |
|---|---|---|
| EP | 1335130 B1 | 2/2003 |
| GB | 2057584 A * | 4/1981 |
| JP | 63-57874 | 3/1963 |
| JP | 58098665 A * | 6/1983 |
| SU | 1242637 | 7/1986 |
| WO | WO 9902853 A1 * | 1/1999 |

\* cited by examiner

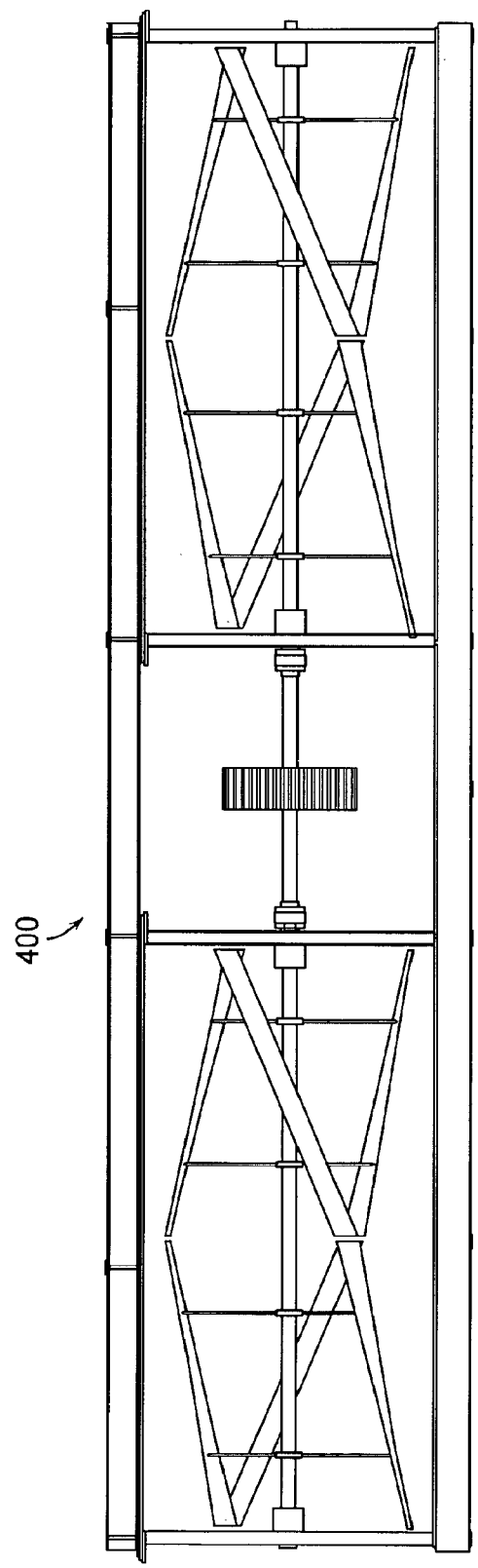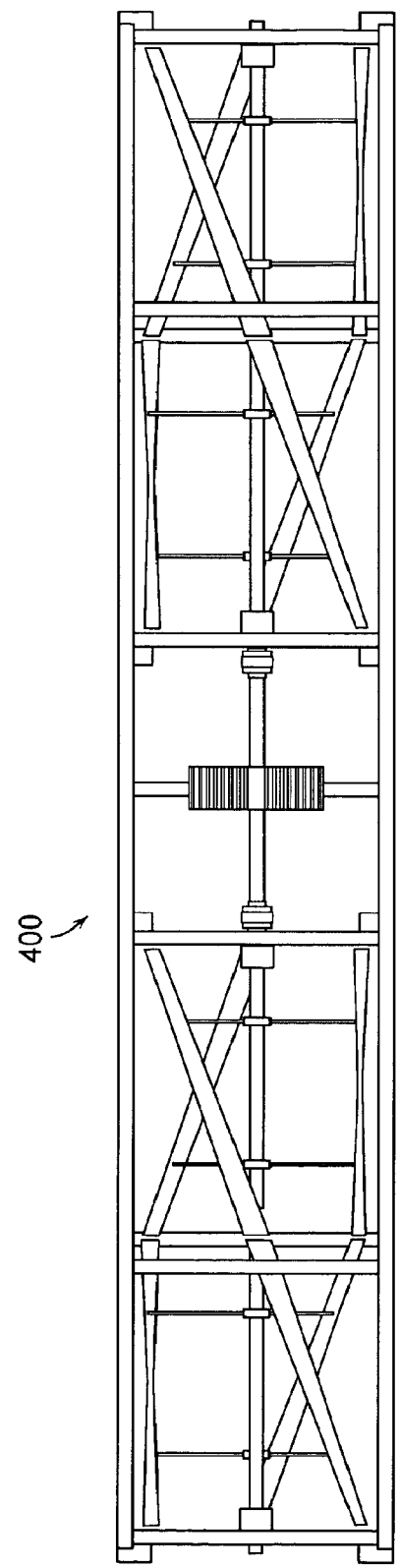
Figure 9
Figure 10

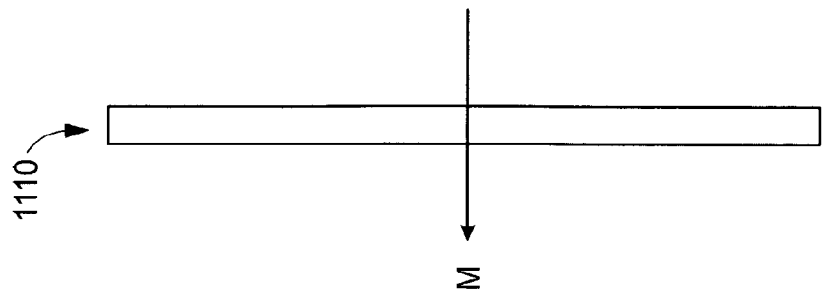
Figure 15A
Figure 15B
Figure 15C

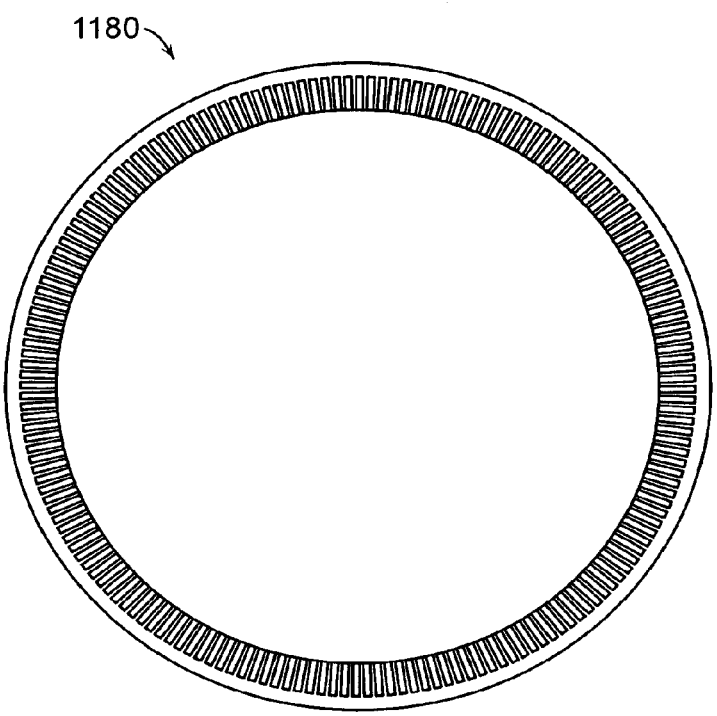
Figure 17A
Figure 17B
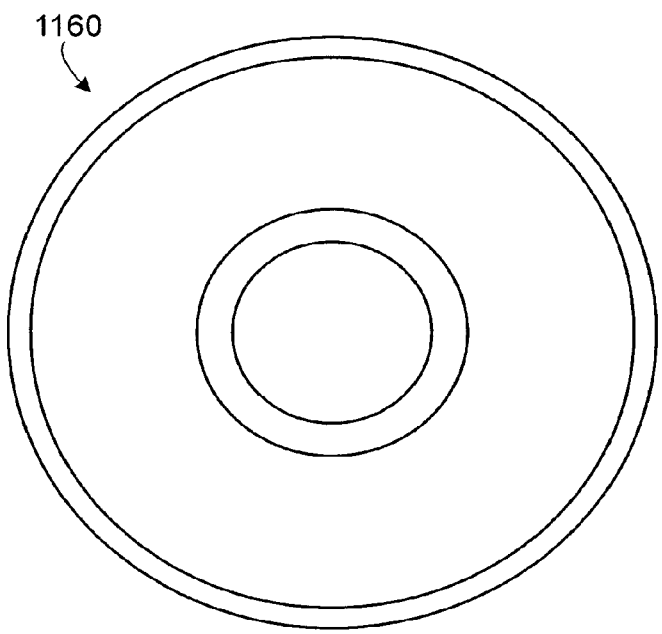
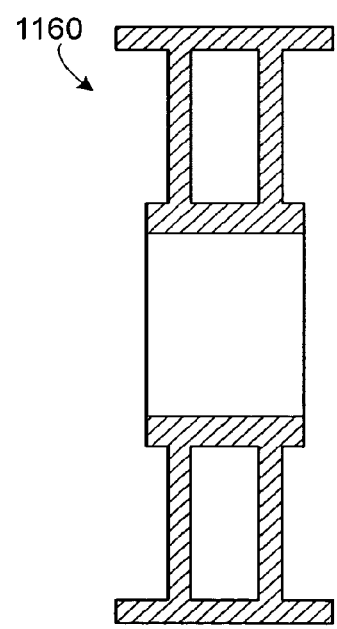
Figure 16A
Figure 16B

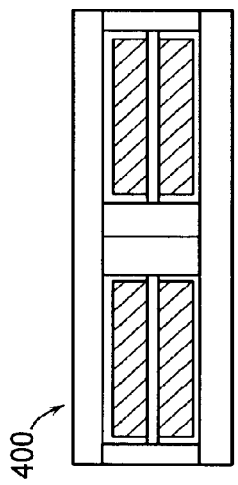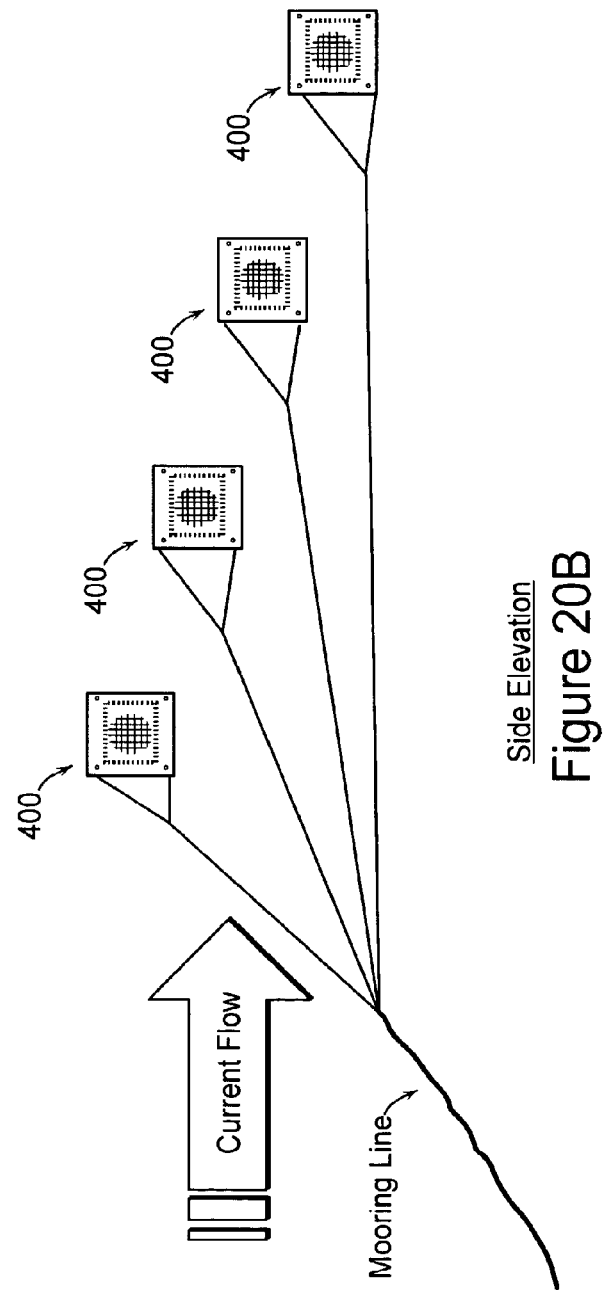

Front Elevation

Side Elevation

Current Flow

Mooring Line

US 7,902,687 B2

SUBMERSIBLE TURBINE-GENERATOR UNIT FOR OCEAN AND TIDAL CURRENTS

RELATED APPLICATIONS

The present application claims priority to U.S. Provisional Application No. 60/853,028 filed on Oct. 20, 2006, the entire content of which is incorporated by reference.

BACKGROUND OF THE INVENTION

1. Field of the Invention

The present invention relates generally to sources of renewable energy, and more particularly to a submersible turbine-generator unit for ocean and tidal currents.

2. Related Art

Ocean and tidal currents are capable of providing a virtually inexhaustible supply of emission-free renewable energy. Since ocean and tidal currents exist everywhere in the world and are either constantly flowing or extremely predictable, converting the energy in these currents to electricity could provide a predictable, reliable and, in some cases, base load supply of electricity to the electric power systems or remote sites in many parts of the world. Seventy percent (70%) of the world's population lives within 200 miles of an ocean. Accordingly, ocean current energy could become a vital part of the world's energy future.

The tremendous growth in renewable energy over the past several years is well documented and the rate of growth continues to increase each year. With worldwide awareness of the negative environmental impacts of fossil fuels on our global environment, growth in the use of renewable energy appears to be constrained only by the ability to produce and deliver it at an economic price. Wind power, for example, once considered a fringe energy technology, has now entered the mainstream and has been the fastest growing segment of the energy industry over the last several years. Congress' 2005 Energy Bill is the first major piece of U.S. legislation to recognize the vast potential of the waves and currents for deriving clean, renewable energy from our oceans. This pivotal legislation includes many incentives that are expected to accelerate the development and commercialization of technologies to produce electric power from the oceans. This bill also authorized funding of $632 million in fiscal year 2007, $734 million in fiscal year 2008 and $852 million in fiscal year 2009 for renewable energy research, development, demonstration and commercial application projects, including ocean energy projects. These, and other incentives, bode well for the continued development of ocean energy technologies, and the commercialization of ocean energy projects at an increasing pace.

While wind generation is rapidly expanding and is an important piece of solving the world's energy needs, wind resources are limited, power generated by wind is not predictable and "view shed" and "not-in-my-back-yard" issues restrict development of wind projects. In fact, view shed issues have become a major obstacle for develop of most projects, regardless of their societal benefits.

Ocean power generation, on the other hand, has essentially unlimited development potential, is predictable, if not constant. Although power generated from ocean energy can be directly "plugged into" coastal load centers and remote communities, it is not restricted to these markets. A system for marketing renewable energy in the United States and Canada now exists called "Green Tag". This market system allows a power producer to generate renewable energy in one location and sell it anywhere in the country to satisfy local renewable portfolio standards that have been mandated by various states. Other large markets for ocean derived power include the Federal Power Administrations, such as the Western Area Power Administration, and the United States military, which is under a mandate to increase purchases of renewable energy as an energy independence and national security strategy.

Internationally, the market for renewable energy is virtually unlimited. In European Union countries, for example, a considerable premium over fossil fuel generation is currently being paid for "green" power. There are many potential sites for ocean current energy in Northern Europe near the United Kingdom, in Southern Europe near the mouth of the Mediterranean Sea, as well as off the coasts of South America, Africa and Japan, and many of these countries are providing special incentives to ocean renewable energy projects. In addition, there are countless numbers of island communities where ocean currents accelerate around and between land masses. Coastal communities throughout the world will be the primary beneficiaries of ocean power due to the presence of strong ocean and tidal currents and insufficient energy supply. With its vast and geographically dispersed resources as shown in FIG. 1, ocean current energy has the potential of becoming the next "wind" of renewable energy.

One of the greatest potential sources of ocean current energy in the world is the Florida Current as shown in FIG. 2. The Florida Current is the portion of the Gulf Stream that runs in a northerly direction off the east coast of the United States from the Florida Keys to Cape Hatteras in North Carolina. The Florida Current is a particularly attractive renewable energy resource because it is relatively close to the Florida coast (i.e., generally between 10 and 25 miles) and it flows constantly in a northerly direction at a rate of up to 5 knots.

Although the speed and exact location of the Florida Current can fluctuate from season to season and year to year, it is relatively stable, predictable and wide enough that the center portion is always within the current boundaries. Importantly, it always flows in a northerly direction, twenty-four hours a day, so it provides a continuous, reliable source of energy. The Florida Current alone has the energy potential to produce tens of thousands of megawatts (MW) of electricity. This is enough electricity to power a substantial portion of the households near the southeast coast of the United States.

Since the Florida Current is relatively close to the shore and to the large population centers on the east coast of Florida, where significant and growing demands for electricity exist, it is ideal for development of ocean current power generation. Additionally, the maximum velocities of the Florida Current occur during the peak months of electricity usage during the summer which means the maximum output of the submersible turbine-generator modules of the present invention would occur during periods when the power is most needed.

Recent studies of the current flows in an area of the preferred site within the Florida Current are promising. At 50 meters below the surface, for example, the water velocity distribution was found to be Gaussian. Flows are very consistent—in the range of 0.642 to 2.435 meters per second (1.25 to 4.73 knots) 99.7% of the time (within three standard deviations of the mean). Moreover, the flow direction varies only 1.5 degrees from an otherwise steady northerly direction of flow. At 50 meters below the water surface, the mean velocity is 1.54 meters per second (3.0 knots) with a standard deviation of 0.2988.

The greatest potential for development of tidal current projects in the United States is in Alaska, where tidal flows are greater than anywhere else in the United States. For example, tides in Anchorage within the upper Cook Inlet of Alaska exceed thirty (30) feet and tidal current flows can exceed 8 knots. While Alaska has been an energy rich state with only 626,000 residents and 2,500 MW of electricity generating capacity, most of the state is now paying substantially higher energy rates than those in the "lower 48." The reasons for this reversal in energy fortunes is that the low cost natural gas in the Anchorage area is rapidly being depleted and there is little or no infrastructure to get the remote energy resources to the areas where it is needed the most. In many areas, electricity is produced by old and inefficient diesel generating plants that are prohibitively expensive and must be subsidized by the state. In reasonably populated areas, the average electric supply rate is approximately $0.12 to $0.15 per kilowatt-hour (kWH) and in rural areas, the rate can reach $0.75 per kWH or more. Due to the severe terrain, weather and environmental constraints in Alaska, there is no integrated transmission system, which has resulted in the proliferation of nearly 120 public and municipal owned utilities.

For the above reasons, the upper Cook Inlet of Alaska can be a primary target for the development of tidal current projects. In addition to providing much needed electricity to the Anchorage area, where approximately one-half of the state's population lives, tidal current generators can be located in tidal currents near to shore in remote, local "pockets" of demand.

As shown in FIG. 3A, two potential tidal generation project sites may be located near the City of Anchorage. Each of the sites has the potential for development of a project with a generating capacity of from 50 to over 100 MW of electricity. Because of the unique submersible feature of tidal current generators according to embodiments of the present invention, the ice which forms on the surface of the Cook Inlet in the winter will not affect either of the sites. The project adjacent to Fire Island could also be developed in conjunction with a wind generation project being developed and installed on Fire Island by Cook Inlet Region and Chugach Electric Company, the local electric utility serving the Anchorage area. Both projects could be easily interconnected with the local utility grid which serves the Anchorage area. Similar sites of equally good potential off the coast of northern Maine are also shown in FIG. 3B.

Using the technology developed herein, off-shore ocean currents could also be used for the production, storage and shipment of hydrogen and/or potable water from sea water from off-shore production facilities. With the abundance of sea water and availability of low cost electricity, as well as the viability of off-shore platform operations as demonstrated in the off-shore oil industry, hydrogen and/or potable water could be produced, stored and shipped in tankers to markets around the world.

Submersible turbine-generator units according to the present invention utilize recent technological advances from several industries and incorporate them into an integrated power system. The industries which have provided these technological advances include the off-shore oil and gas, wind power generation, maritime, shipping and telecommunications. These technological advances include not only unique designs and equipment but also state of the art advanced materials, including composite materials. Such submersible turbine-generator units according to the present invention preferably utilize a highly efficient turbine, known as the advanced design cross-flow turbine ("ADCF Turbine"), which is a derivation of the Darrieus turbine. The efficacy of the ADCF Turbine was demonstrated in a pilot scale project in the summer of 2007 in the United States. The aerodynamic blades of the ADCF Turbine convert the energy in the ocean and tidal currents into mechanical energy that transfers through the turbine shafts to a permanent magnet generator. The generator converts the mechanical energy (i.e., RPM and torque) into electricity. A power electronics system controls, conditions and synchronizes the generated electricity. The synchronized electricity then transmits to on-shore substations via an undersea transmission cable.

Further details regarding ADCF Turbines may be found in the following U.S. Pat. No. 6,293,835 for a "System For Providing Wind Propulsion Of A Marine Vessel Using A Helical Turbine Assembly"; U.S. Pat. No. 6,253,700 for a "Method For Maintaining Flotation Using A Helical Turbine Assembly", U.S. Pat. No. 6,155,892 for a "Helical Turbine Assembly Operable Under Multidirectional Gas And Water Flow For Power And Propulsion Systems", U.S. Pat. No. 6,036,443 for a "Helical Turbine Assembly Operable Under Multidirectional Gas And Water Flow For Power And Propulsion Systems". U.S. Pat. No. 5,642,984 for a "Helical Turbine Assembly Operable Under Multidirectional Fluid Flow For Power And Propulsion Systems". U.S. Pat. No. 5,577,882 for a "Unidirectional Reaction Turbine Operable Under Reversible Fluid Flow". U.S. Pat. No. 5,451,138 for a "Unidirectional Reaction Turbine Operable Under Reversible Fluid From Flow", U.S. Pat. No. 5,451,137 for a "Unidirectional Helical Reaction Turbine Operable Under Reversible Fluid Flow For Power Systems", the contents of each of which is incorporated herein by reference.

SUMMARY OF THE INVENTION

In an exemplary embodiment of the present invention, a submersible turbine-generator unit for ocean and tidal currents may comprise:

One or more highly efficient turbines rotate in one direction only, regardless of the direction of flow of the current;

A compact design that allows for shop fabrication of the turbine generator units and allows them to be "stacked" in a modular configuration, thereby creating submersible platforms (modules) containing one or more turbine generator units and enabling easy assembly and maintenance in the field;

A linear configuration wherein the one or more turbines and at least one generator rotate on a common shaft (or shaft extensions) and wherein no gears exist between the turbines and generator;

A horizontal configuration where the turbines and generator operate in a horizontal plane to maximize efficiency and minimize inefficiencies caused by variations in current velocity generally existing at different depths;

An optional vertical configuration for deployment in natural and/or manmade waterways having substantially uniform flow velocities through a continuous range of depths; and A submersible permanent magnet generator connected to the one or more turbines by a common rotating shaft (or shaft extensions) and preferably housed in a watertight enclosure.

In one exemplary embodiment, submersible turbine-generator units may be mounted on a variety of support structures in many differing orientations (underwater foundations, floating platforms, submersible structures, etc.).

In another exemplary embodiment, from one to several submersible turbine-generator units can be mounted on a single submersible platform to make a submersible power generation module.

Submersible modules containing one or more turbine generator units according to embodiments of the present invention may be deployed in large arrays consisting of multiple submersible modules that are connected to an on-shore electric substation using an underwater transmission line. Each submersible module may be synchronized with the on-shore electricity grid. Operations may be monitored and controlled from on-shore computers, and the submersible modules may be brought to the surface for inspection and maintenance.

The submersible power generation modules which incorporate submersible turbine generator units according to embodiments of the present invention provide a unique and technologically advanced undersea power generation solution which overcomes the technological challenges of operating and maintaining underwater power systems and associated electrical interconnections. The submersible power generation modules may generate electricity from both tidal currents and open ocean currents, and, additionally, may generate electricity via deployment in any other natural or man-made water flow, such as rivers, causeways, canals, and dams.

In summary, the simple, modular design of submersible turbine-generator units according to embodiments of the present invention may be sized to address a wide range of sites and water flow conditions and, thereby, offer a better opportunity for achieving widespread market acceptance, economies of scale in production and maintenance, and utilization of a greater range of renewable ocean energy resources.

Submersible turbine-generator units according to embodiments of the present invention also avoid deleterious interaction with marine life; observations of prior demonstrations of the cross flow turbines reveal no adverse impacts on marine life. Because of a small pressure differential builds up in front of the rotating turbine blades, fish and other marine life sense such differential as a "solid" object and move to avoid it.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements.

FIG. 9 depicts a side view in a CAD projection of the submersible turbine-generator unit shown in FIG. 8;

FIG. 10 depicts a top view in a CAD projection of the submersible turbine-generator unit shown in FIG. 8;

FIG. 15 depicts the generator magnets of the subscale model of the submersible turbine-generator unit;

FIG. 16 depicts a rotor spider of the subscale model of the submersible turbine-generator unit;

FIG. 17 depicts the stator laminations of the subscale model of the submersible turbine-generator unit;

FIG. 20 depicts front and side elevations of a plurality of submersible turbine-generator units deployed by a single mooring line according to an embodiment of the present invention;

FIG. 26b depicts a left end view of the generator assembly of FIG. 26a.

FIG. 26c depicts a right end view of the generator assembly of FIG. 26a.

FIG. 26d depicts a top view of the generator assembly of FIG. 26a.

FIG. 27 depicts one embodiment of a watertight housing for the generator assembly depicted in FIG. 26a.

DETAILED DESCRIPTION OF EMBODIMENTS OF THE PRESENT INVENTION

Exemplary embodiments of the invention are discussed in detail below. While several specific exemplary embodiments may be discussed, it should be understood that this is done for illustration purposes only. A person skilled in the relevant art will recognize that other components and configurations can be used without departing from the spirit and scope of the invention.

Figure 1:
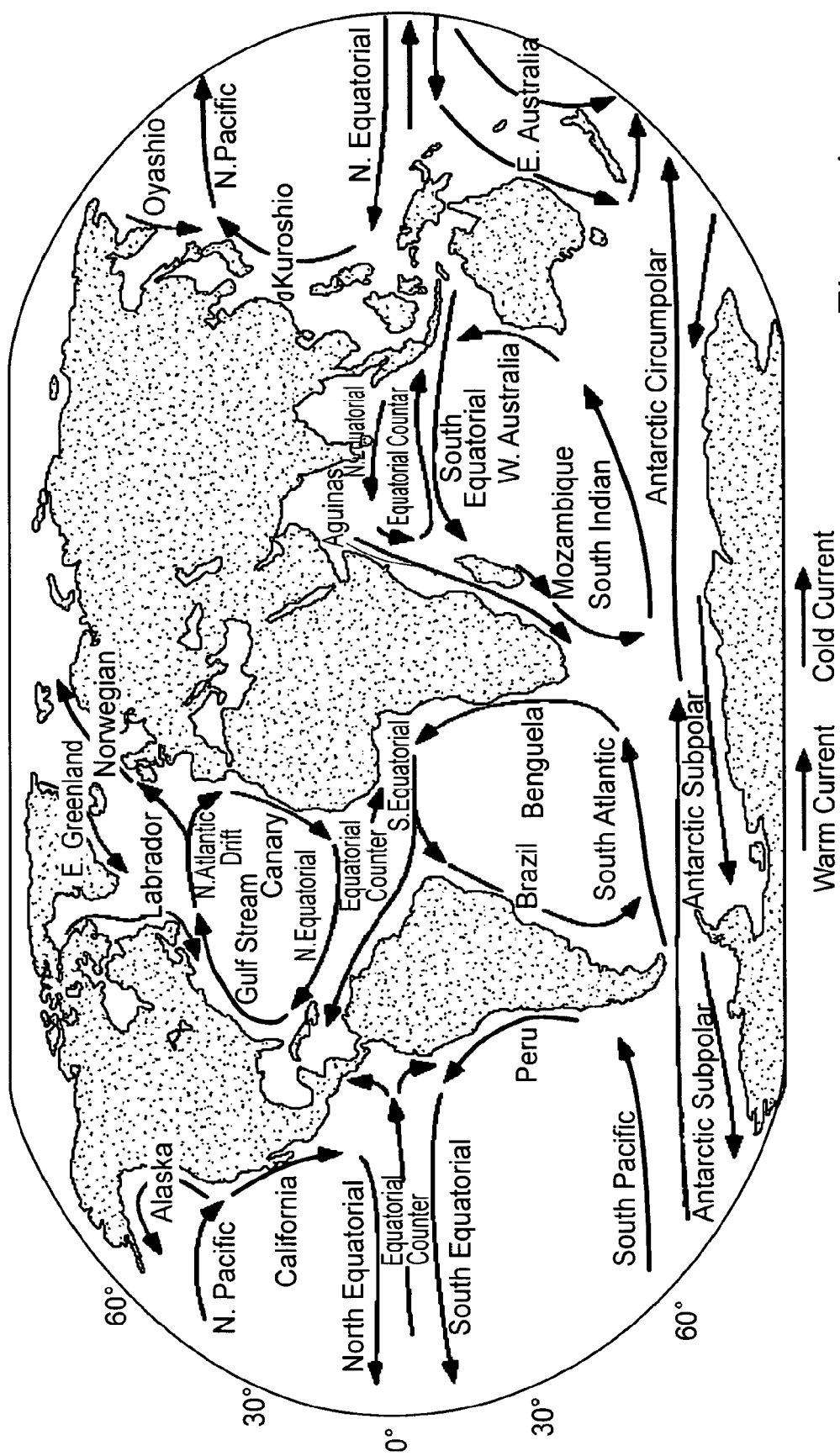
FIG. 1 depicts a worldwide view of ocean currents.
Figure 2:
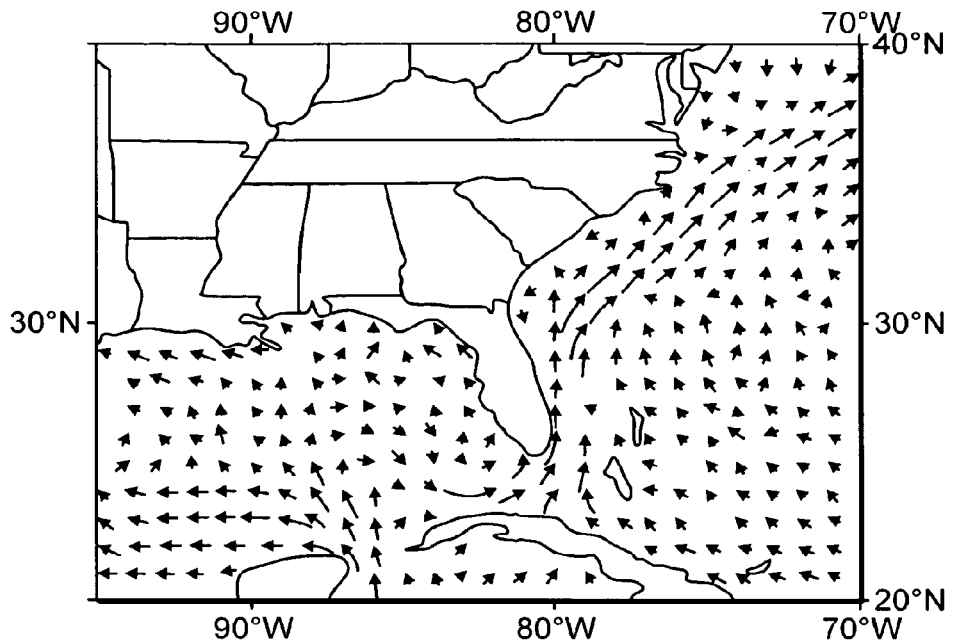
FIG. 2 depicts a closer view of ocean currents in the vicinity of the southeast coast of the United States, particularly showing the Florida current.
Figure 3A:
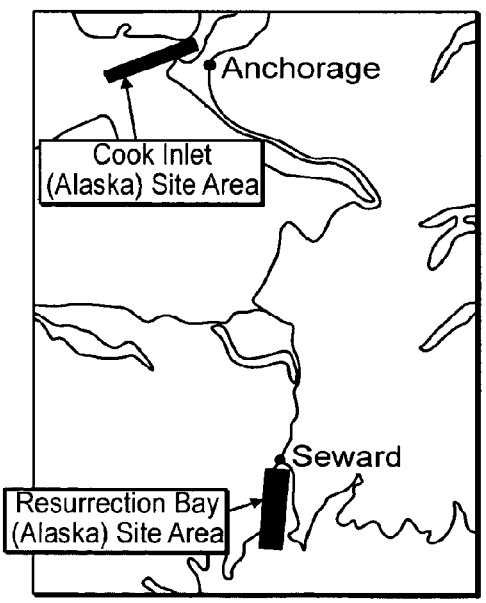
FIGS. 3A and 3B depict potentially valuable tidal current locations in the Cook Inlet and Resurrection Bay areas of Alaska in the vicinity of Anchorage, and Cobcook Bay and the Western Passage areas in northern Maine.
Figure 3B:
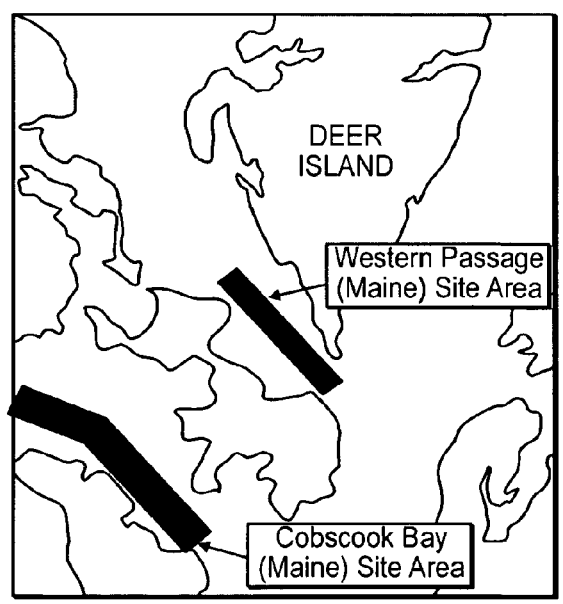
Figure 4:
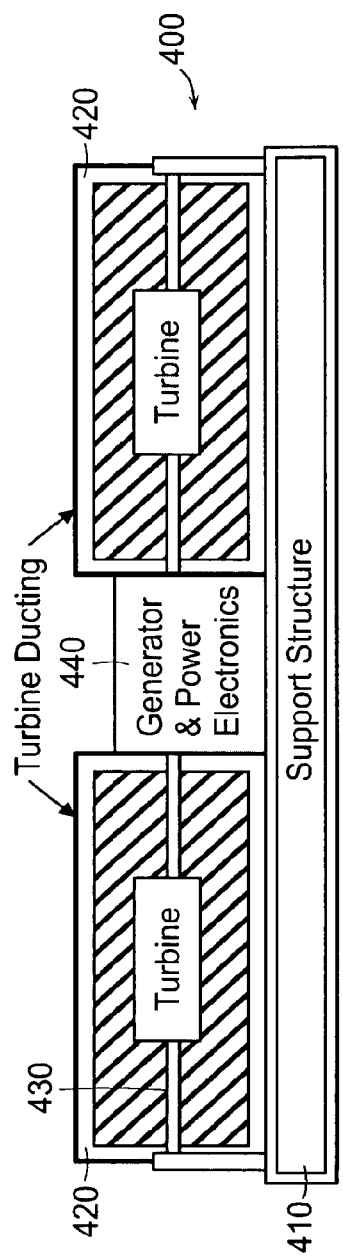
FIG. 4 depicts a front elevation view of a submersible turbine-generator unit according to an embodiment of the present invention.
Figure 5:
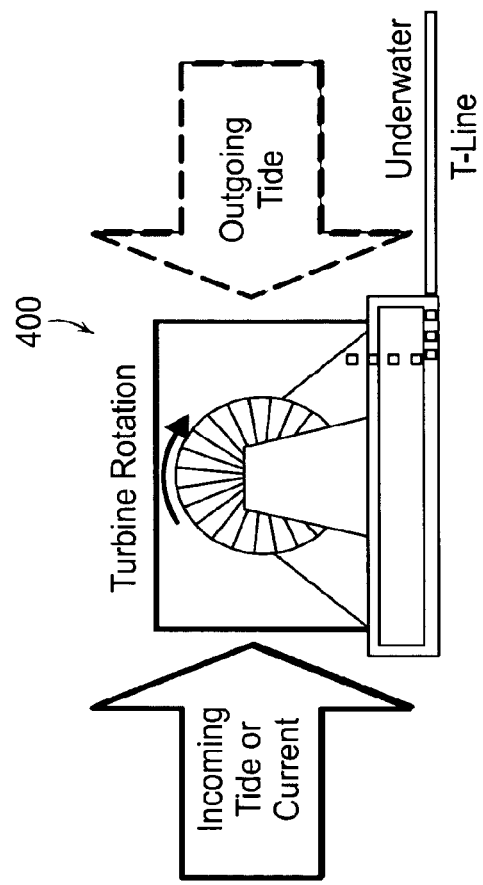
FIG. 5 depicts a side elevation view of the submersible turbine-generator unit shown in FIG. 4.
Figure 6:
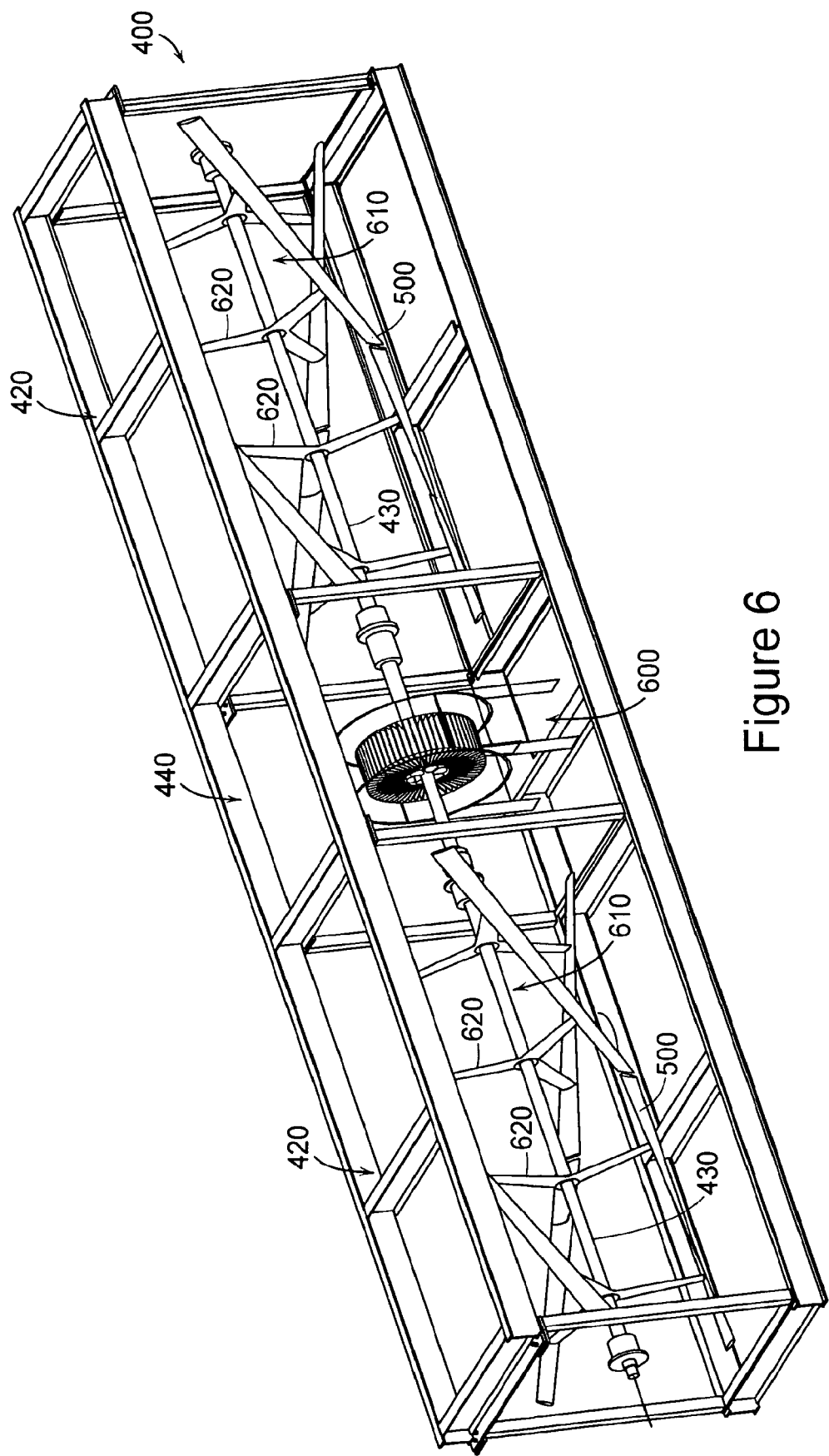
FIG. 6 depicts an orthogonal view in a CAD projection of a submersible turbine-generator unit according to another embodiment of the present invention.
Figure 7:
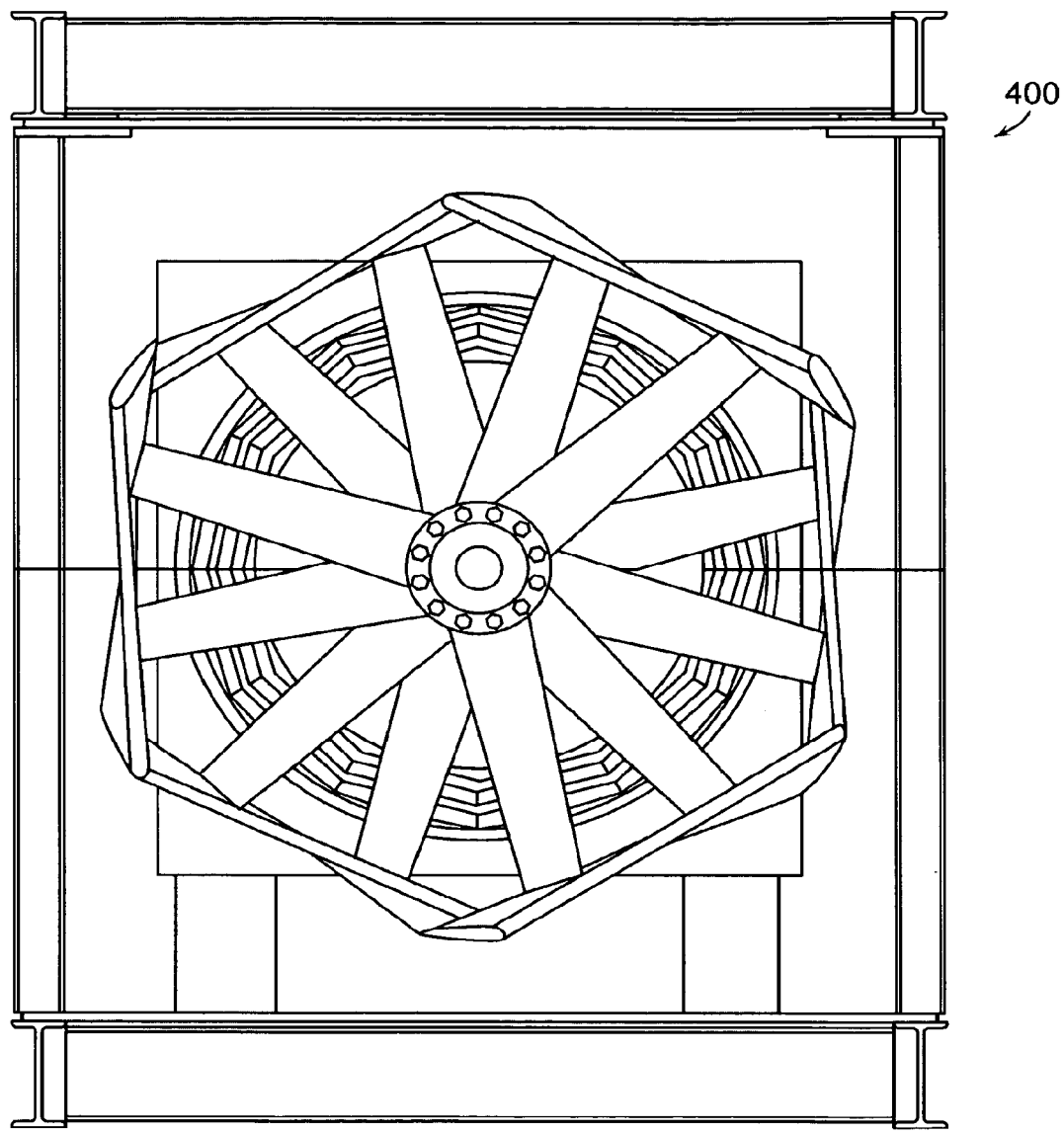
FIG. 7 depicts an end view in a CAD projection of a generator portion of the submersible turbine-generator unit shown in FIG. 6.
Figure 8:
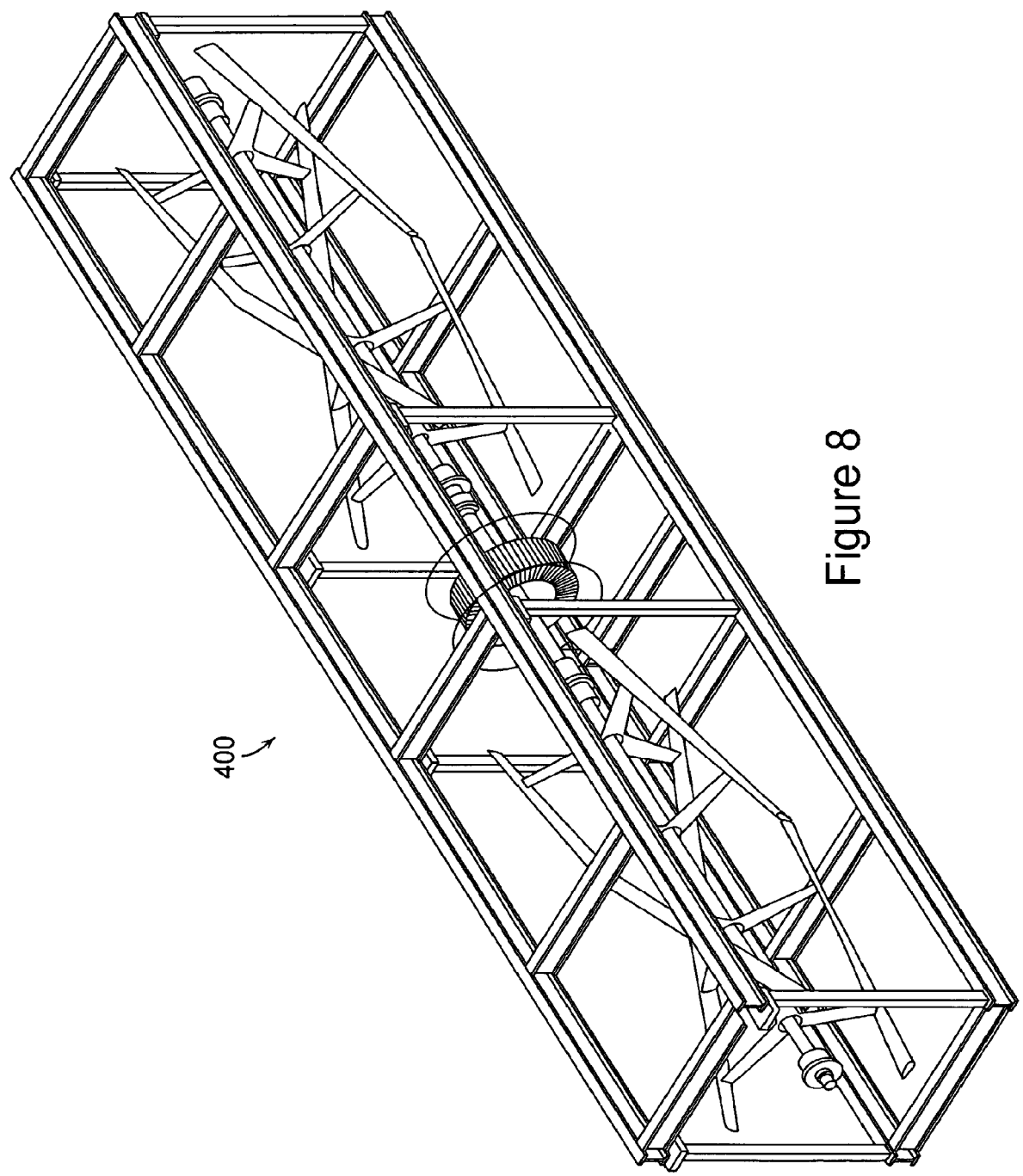
FIG. 8 depicts a perspective view in a CAD projection of the submersible turbine-generator unit shown in FIG. 6.

Referring now to FIGS. 4 and 5, there is shown a submersible turbine-generator unit 400 according to one embodiment of the present invention. turbine-generator unit 400 generally comprises a support structure 410 upon which at least one, and preferably a pair, of turbines 420 are coupled by a single shaft 430 to a generator (not shown in FIGS. 4 and 5) within a pressurized enclosure 440.

As shown in the CAD projections of FIGS. 6-10, module 400 further comprises unique turbine blades 500 to drive a generator 600. On example of a configuration of turbine blades 500 useful in the present invention is that of a Gorlov Helical Turbine (GHT).

In such a manner, turbine-generator unit 400 comprises a pair of turbines 420 capable of providing unidirectional rotation under a reversible ultra low head pressure and/or relatively high velocity fluid flow. Each turbine 420 thus comprises a plurality of airfoil-shaped blades 500 mounted transversely to the direction of fluid flow for rotation in a plane parallel to the fluid flow. In one embodiment, the blades 500 form a helical configuration, a modification of a delta turbine, which ensures that a portion of the blades always angles perpendicular to the fluid flow. This configuration enables maximum thrust for spinning respective turbine 420. Skewed leading edges of the blades 500 further reduce resistance to rotation of the turbine 420. A channel having a rectangular cross-section may be provided to direct the fluid flow to the blades 500. The channel may have a curved configuration having opposed changes in elevation or bulges directed towards the center of each turbine 420 in a plane parallel to the flow of fluid to optimize the angle of attack of the fluid on the blades. At ultra low head fluid pressures, the turbines 420 are capable of achieving relatively high speeds.

The following benefits make the turbines 420 especially valuable for generating hydroelectric power:

- Demonstrates superior power efficiency in free currents compared to other known turbine designs
- Rotates at a constant ratio of the velocity of the water current flow
- Self-starting in water current flows as low as two feet/second
- Rotates in the same direction, independent of water flow direction (This is especially advantageous for tidal and wave energy systems.)
- Minimal fluctuation in torque
- No cavitation, even at high rotating speeds Accordingly, as shown in FIGS. 6 through 10, each turbine 420 is a unidirectional turbine capable of rotation under reversible fluid flow, comprising a fluid flow path defined by an inflow fluid channel and an outflow fluid channel, and a turbine chamber 610 disposed between the inflow and outflow channels. Rotatable shaft 430 is transversely mounted in the turbine chambers 610. At least one turbine blade support member 620 is fixedly mounted to the rotatable shaft 430 for rotation therewith in a plane perpendicular to the shaft 430.

A plurality of turbine blades 500 is disposed in the turbine chambers 610, with each blade 500 having a delta configuration and an airfoil shape with a leading edge and a trailing edge and a chord there between. The airfoil shape is oriented transversely to the flow path with the chord lying generally along a circular rotation path. Each of the blades 500 is fixedly mounted to the blade support member 620 to be parallel to and radially spaced from the rotatable shaft 430 and oriented for rotation along the rotation path in a plane parallel to the flow path in the direction of the leading edge. The turbine chambers 610 have a curved configuration with opposite elevations in the plane parallel to the flow path. The elevations are offset in a direction of rotation of the leading edge to rotatably channel fluid in the flow path and to direct fluid flow to the plurality of blades 500 with a radial component of flow relative to the blades 500. The turbine blades 500 and blade support members 620 may comprise any material capable of withstanding fluid forces. Such materials may include metals or metal alloys, composite or polymer materials. For example, the turbine blades 500 of one embodiment of the present invention comprise a composite material of resin-impregnated carbon fiber.

Further details regarding variations of the turbines 420 may be found in the aforementioned U.S. Pat. No. 6,293,835 for a "System For Providing Wind Propulsion Of A Marine Vessel Using A Helical Turbine Assembly"; U.S. Pat. No. 6,253,700 for a "Method For Maintaining Flotation Using A Helical Turbine Assembly", U.S. Pat. No. 6,155,892 for a "Helical Turbine Assembly Operable Under Multidirectional Gas And Water Flow For Power And Propulsion Systems", U.S. Pat. No. 6,036,443 for a "Helical Turbine Assembly Operable Under Multidirectional Gas And Water Flow For Power And Propulsion Systems". U.S. Pat. No. 5,642,984 for a "Helical Turbine Assembly Operable Under Multidirectional Fluid Flow For Power And Propulsion Systems". U.S. Pat. No. 5,577,882 for a "Unidirectional Reaction Turbine Operable Under Reversible Fluid Flow". U.S. Pat. No. 5,451,138 for a "Unidirectional Reaction Turbine Operable Under Reversible Fluid From Flow", U.S. Pat. No. 5,451,137 for a "Unidirectional Helical Reaction Turbine Operable Under Reversible Fluid Flow For Power Systems", the contents of each of which is incorporated herein by reference.

Referring now to FIGS. 7 and 11-19, the following description addresses further details regarding the design and construction of generator 600. One of ordinary skill in the art will recognize that all reference dimensions and annotations included on corresponding figures are intended only for example purposes and that modifications are acceptable in keeping with the spirit of the present invention. In one embodiment, a subscale model permanent magnet generator 600 is approximately 27 inches in overall diameter and approximately 12 inches in axial length and weighs approximately 1000 lbs. when fully assembled. Those of ordinary skill in the art will appreciate, however, that the design and construction of generator 600 according to embodiments of the present invention are fully scalable by.

Figure 11:
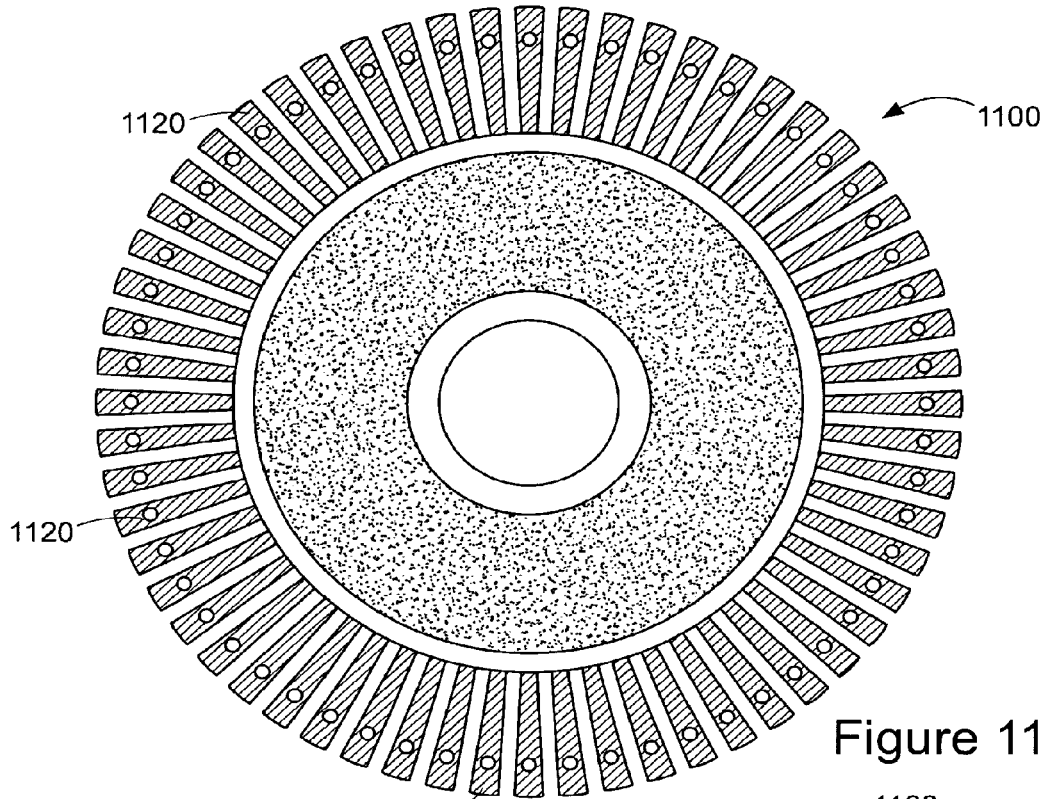
FIG. 11 depicts the magnet pole pieces of a rotor according to a subscale model of the submersible turbine-generator unit designed in accordance with yet another embodiment of the present invention.
Figure 12A:
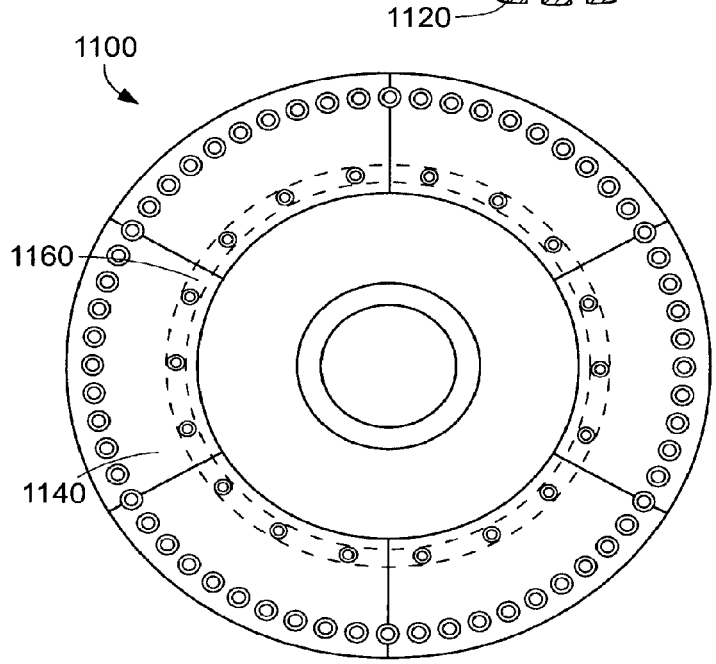
FIG. 12 depicts a rotor assembly of the subscale model of the submersible turbine-generator unit.
Figure 12B:
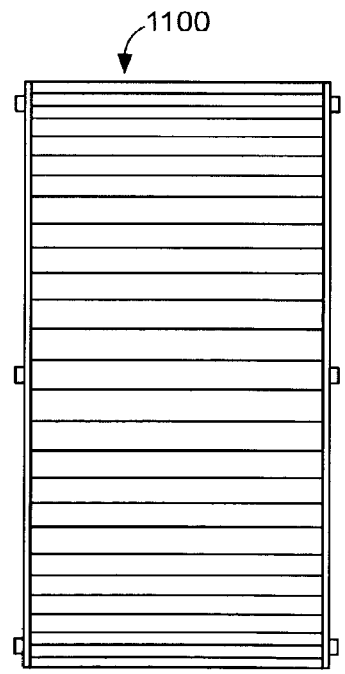
Figure 14B:
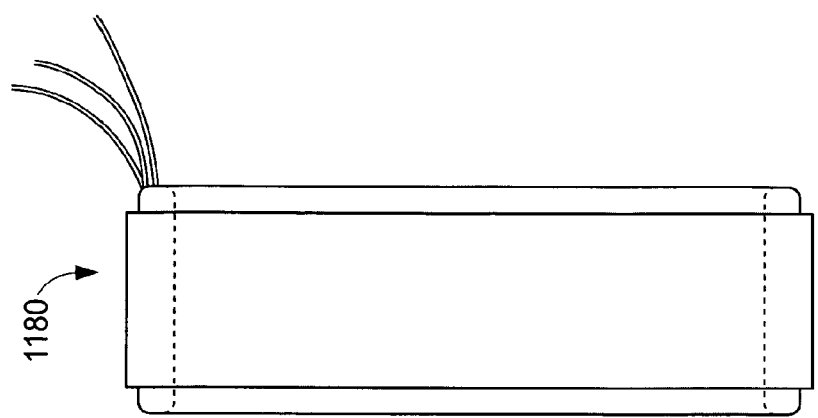
FIG. 14 depicts a stator assembly of the subscale model of the submersible turbine-generator unit.
Figure 14A:
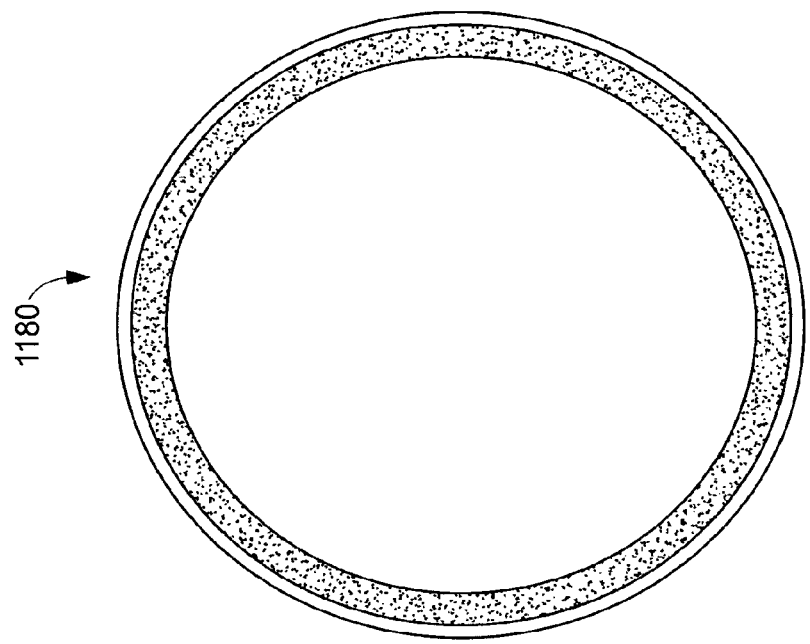
Figure 13A:
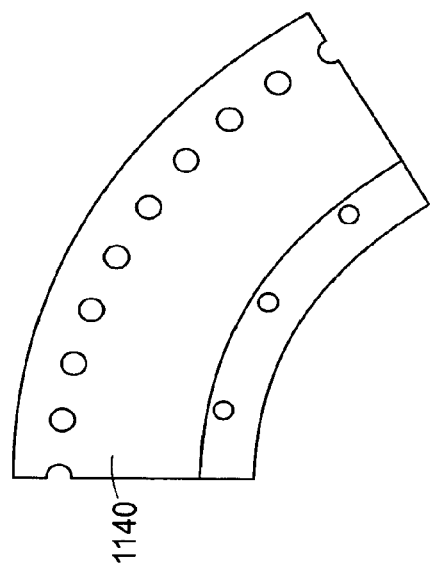
FIG. 13 depicts a rotor plate of the subscale model of the submersible turbine-generator unit.
Figure 13B:
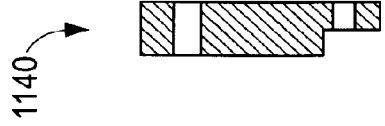
Figure 18:
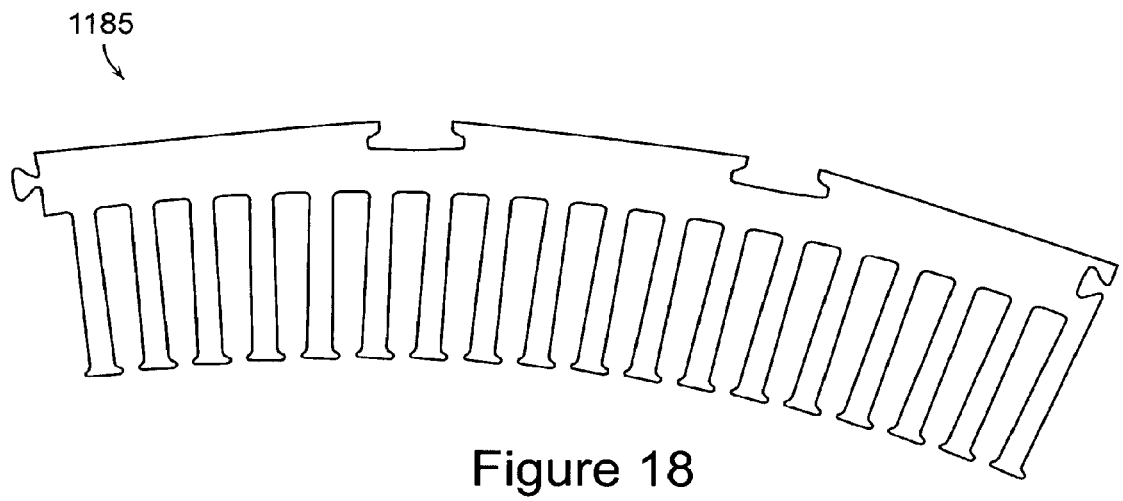
FIG. 18 depicts in greater detail a stator lamination segment of the subscale model of the submersible turbine-generator unit.
Figure 19A:
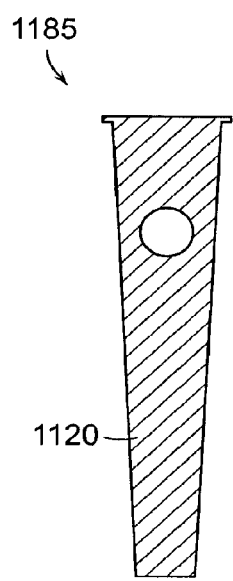
FIG. 19 depicts in greater detail the magnet pole pieces of the subscale model of the submersible turbine-generator unit.
Figure 19B:
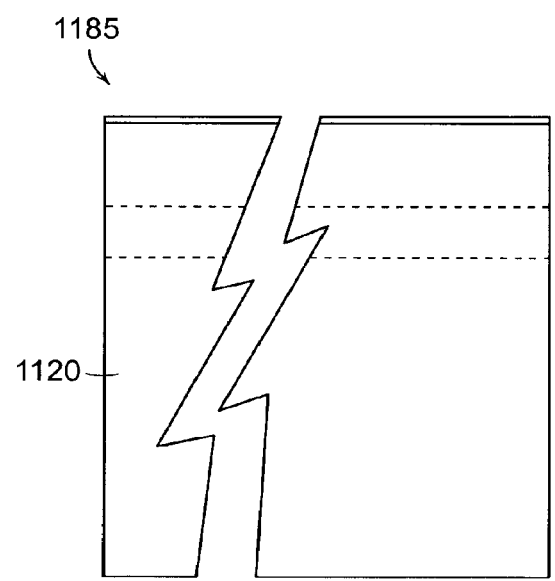
Figure 21A:
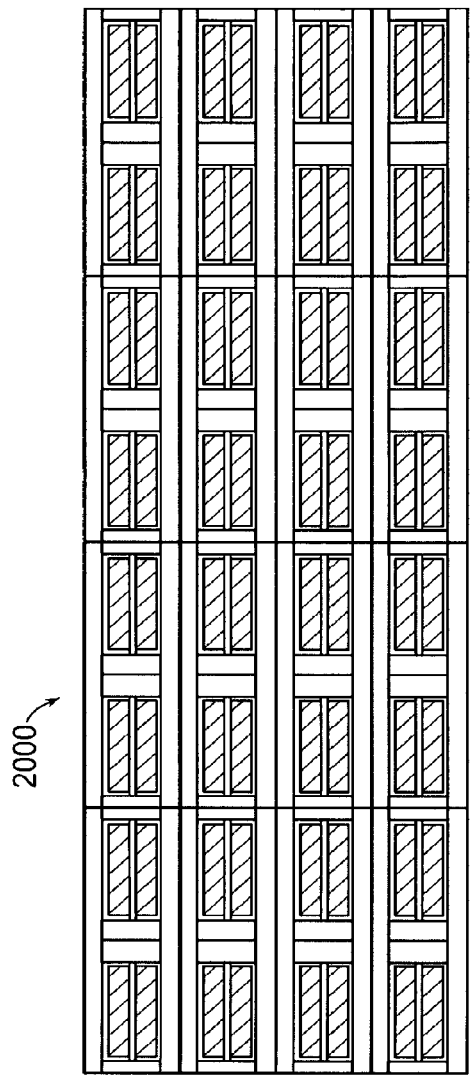
FIG. 21 depicts front and side elevations of an array of submersible turbine-generator units deployed by a single mooring line according to another embodiment of the present invention.
Figure 21B:
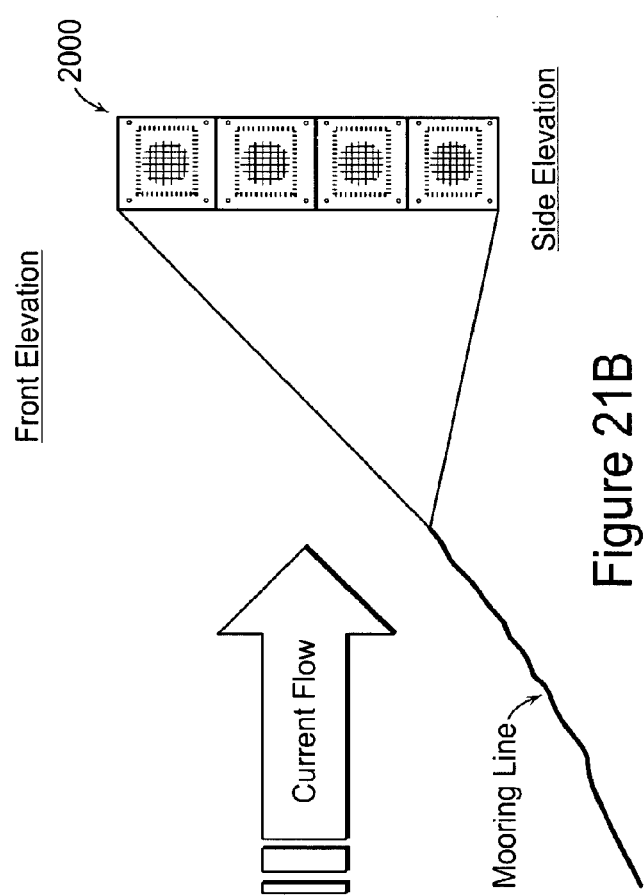
Figures 22A, 22B:
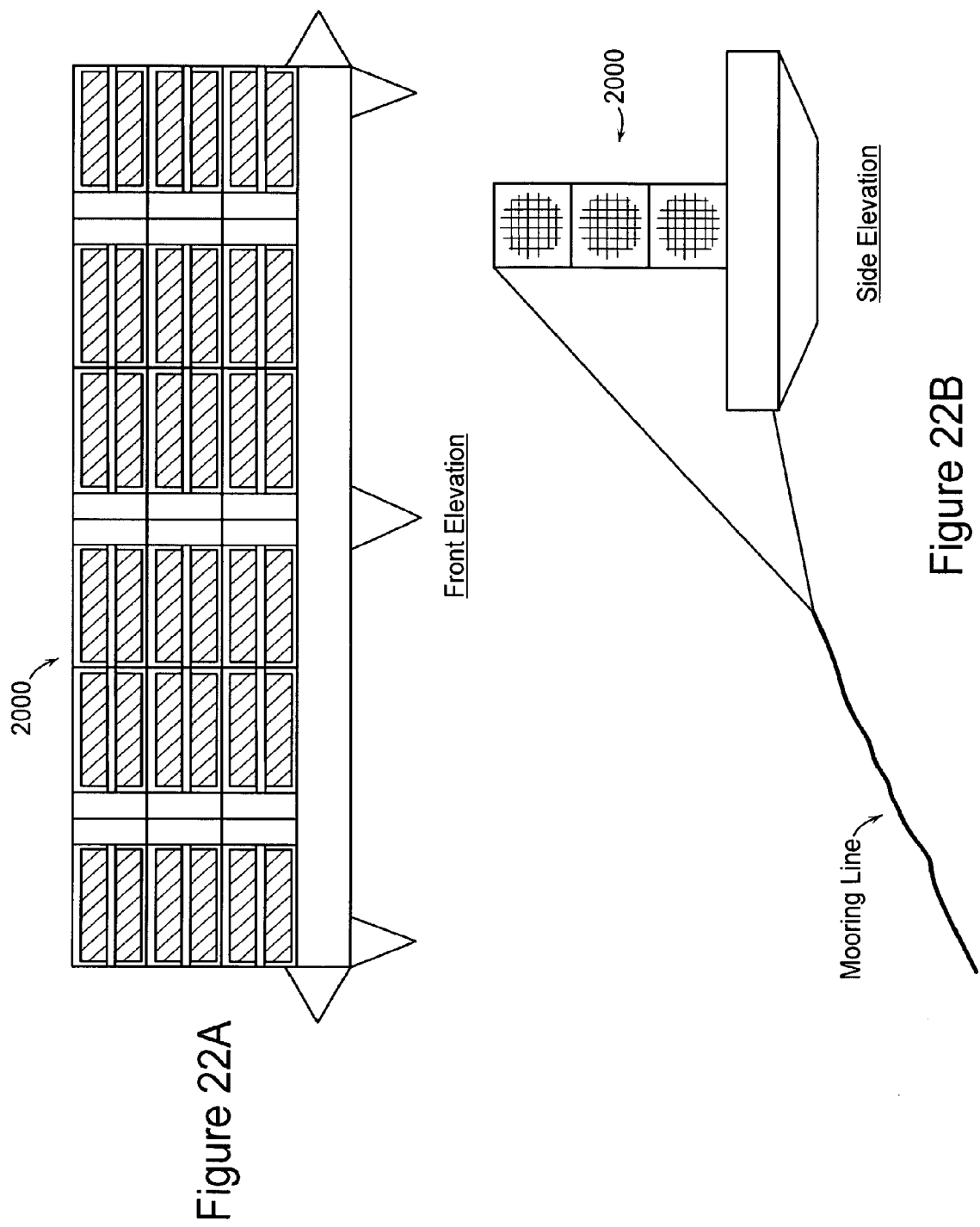
FIG. 22 depicts front and side elevations of another array of submersible turbine-generator units deployed by a single mooring line according to yet another embodiment of the present invention.
Figure 23:
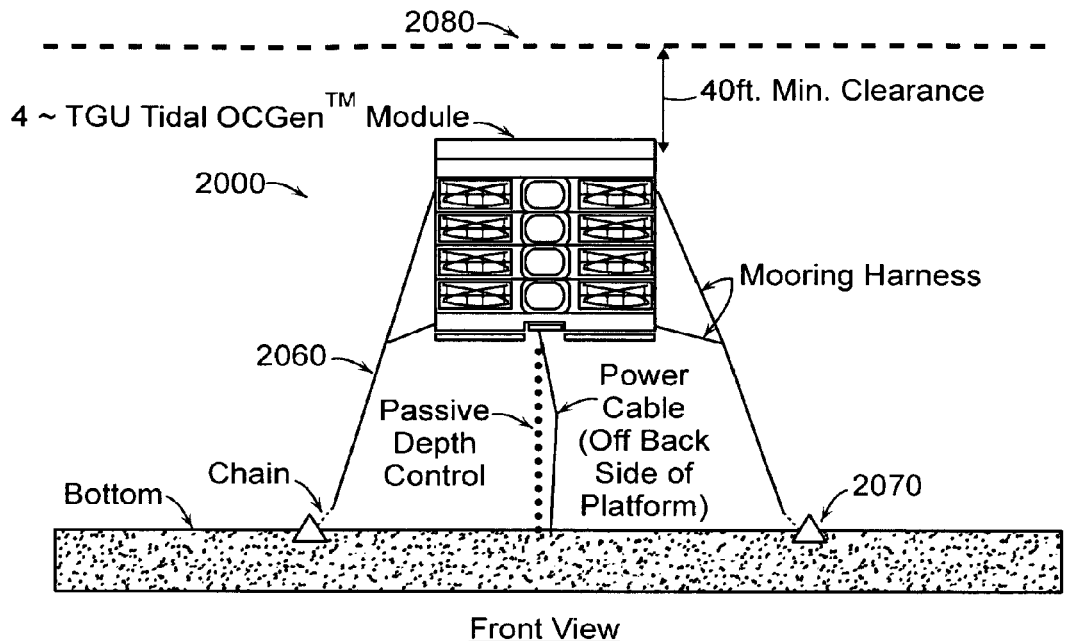
FIG. 23 depicts a front elevation of another submersible turbine-generator module according to yet another embodiment of the present invention.
Figure 24:
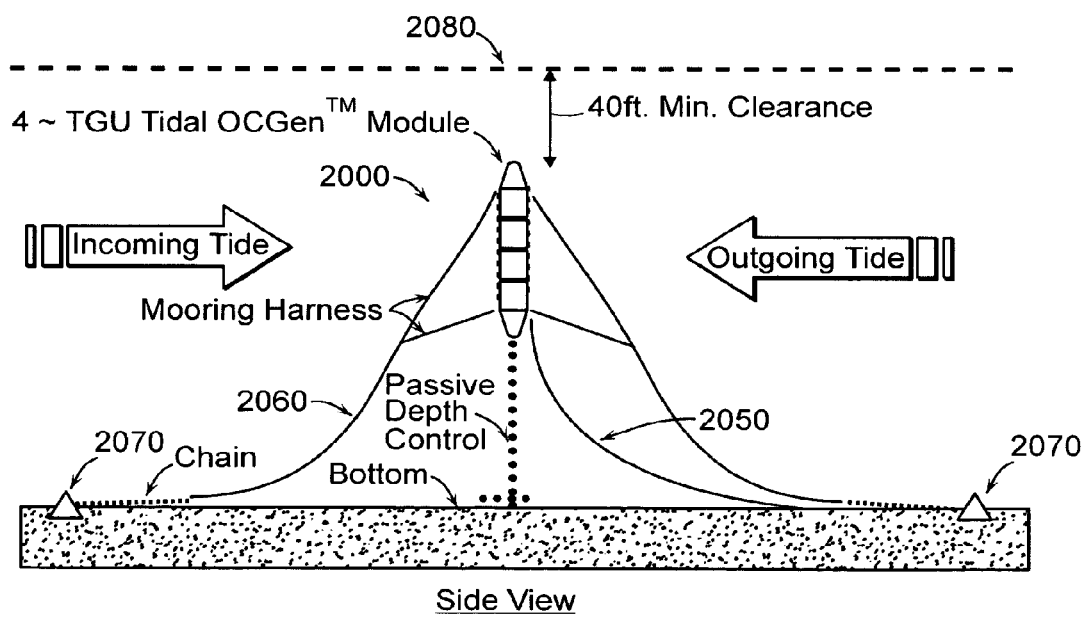
FIG. 24 depicts a side elevation of the submersible turbine-generator module of FIG. 23.

As shown in at least FIGS. 11-13, one embodiment of the modular magnet rotor 1100 of the present invention may consist of 60 (i.e., comprising 120 pieces) rectangular neodymium magnets 1110 interleaved with 60 cast steel magnet pole pieces 1120. In one embodiment, the modular magnet rotor 1100 comprises in ten (10) identical pie-shaped circumferential segments securely joined by end plates 1140 fastened to a spider 1160. The end plates 1140 and spider 1160 may be manufactured from any durable material and preferable are manufactured from a durable metal material such as aluminum or steel.

In one embodiment, the wound stator 1180 may consist of ten (10) identical pie-shaped circumferential segments 1185 of stack made up of 24GA electrical steel laminations each consisting of 18 slots and 18 coils. The coils (not shown) may be comprised of random wound round magnet wire film-insulated with Class H (200° C. rated). Since the winding may be a 3-phase winding, each stator segment 1185 may have six (6) coils per phase interconnected with some coil sides (those that will be inserted into slots in adjacent stator segments) left dangling and with some slots left unfilled (for the dangling coil sides from adjacent stator segments).

The modular design of the present invention enables on site assembly and repair. For example, if one stator segment 1185 fails, an operator may remove and replace only that particular failed segment 1185. A generator frame 2610 (shown in FIGS. 26a through 26d) enables the stator segments 1185 to slide into place on shaped pins or dovetails such that the stator segments 1185 align with the associated segments of modular magnet rotor 1100 During assembly, associated segments 1185 attach to corresponding segments of magnet rotor 1100 by means of an appropriate temporary assembly fixture or bracket having a specifically sized air gap spacer between the stator segment 1185 and corresponding segment of rotor 1100. Once assembled on the bracket, all ten of the combined stator-rotor segments are inserted and assembled in the generator frame 2610. The rotor spider 160 with shaft 430 inserts into the assembly and the ten segments of the rotor 1100 connect in radial fashion with the outer diameter of the rotor spider 1160. Any known fastening means is applicable for securing the rotor 1100 to the spider 1160, and preferably the rotor 1100 bolts to the spider 1160.

Figure 26A:
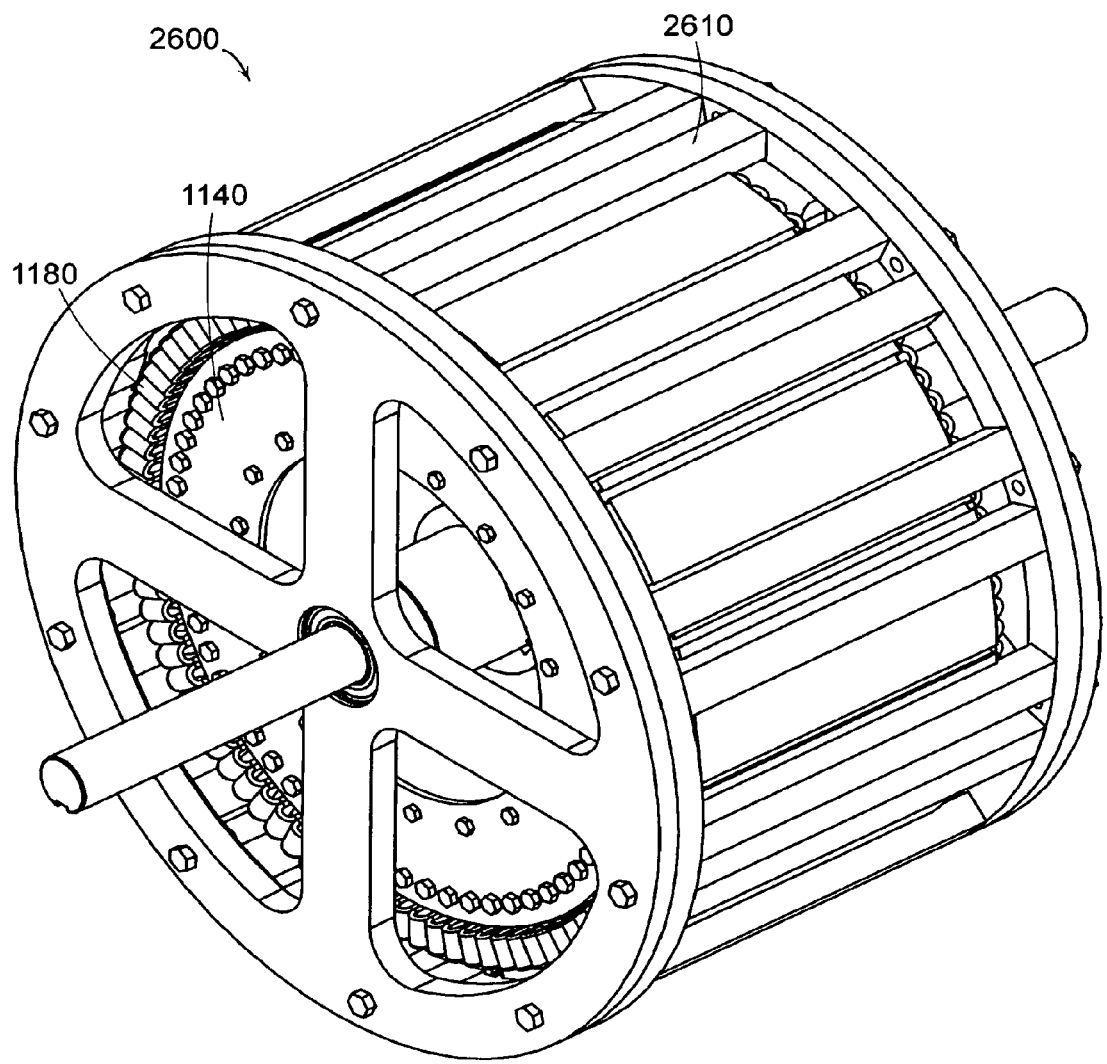
FIG. 26a depicts a perspective view of a generator assembly of one embodiment of the present invention.
Figure 26B:
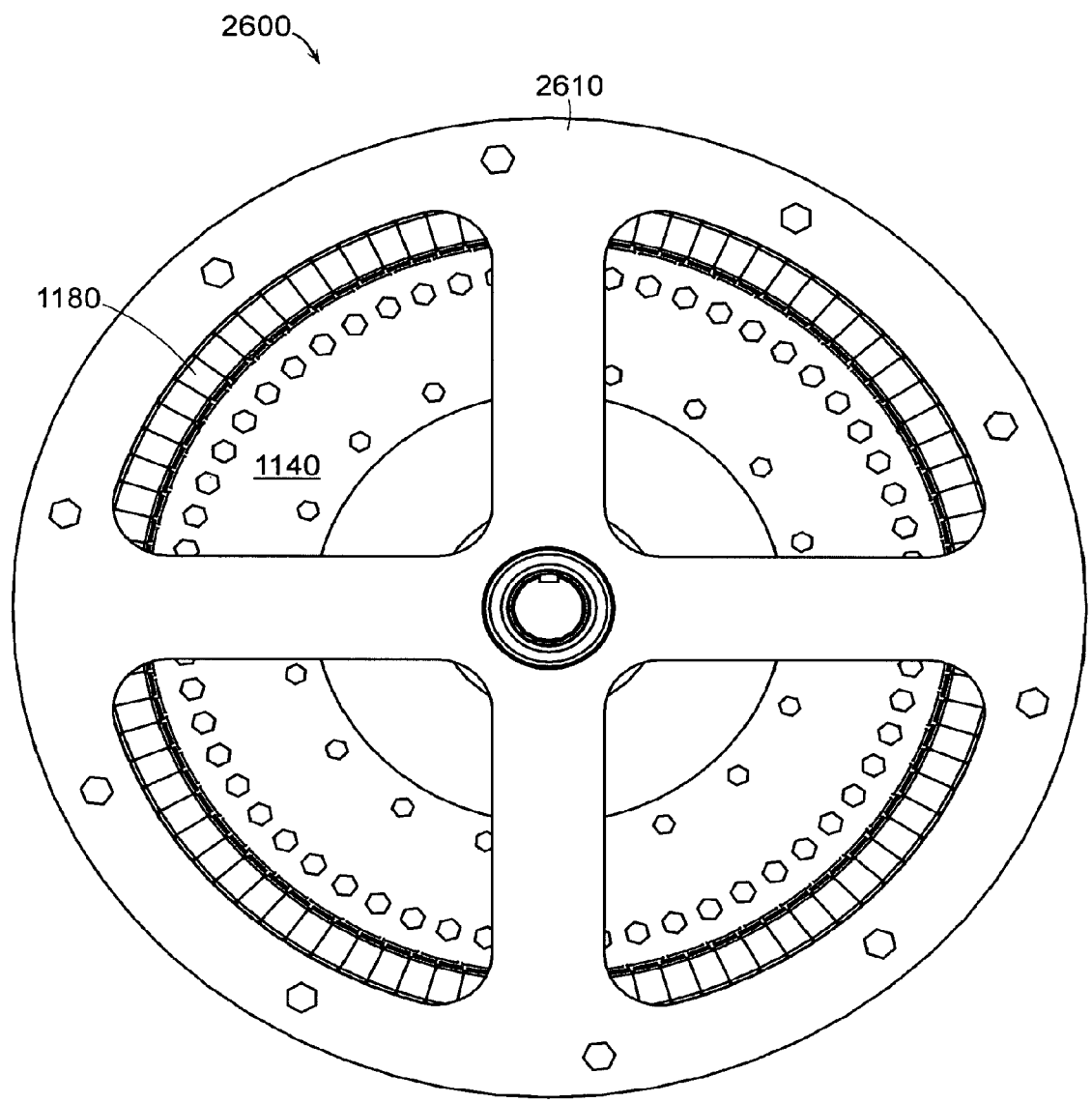
Figure 26C:
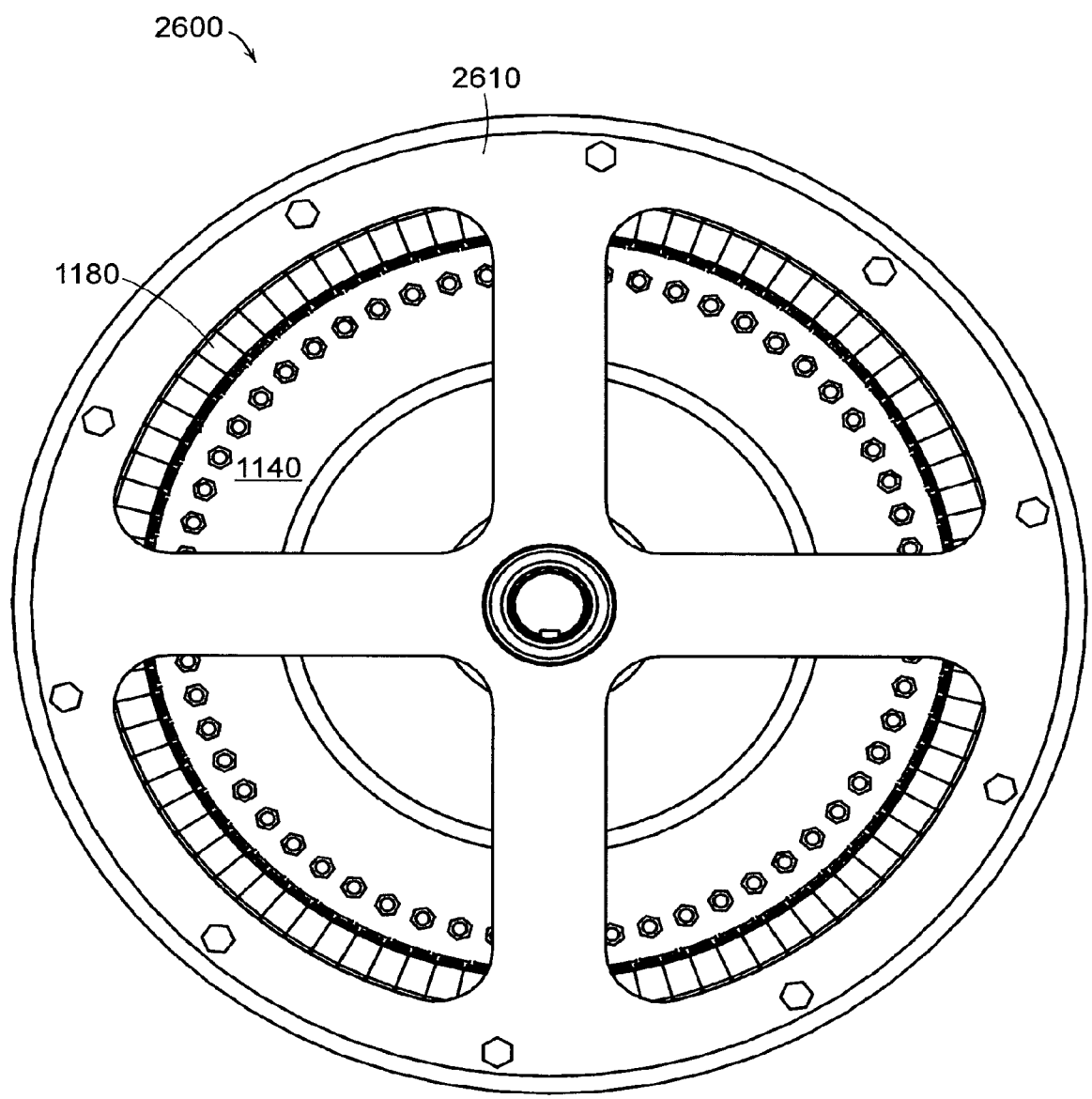
Figure 26D:
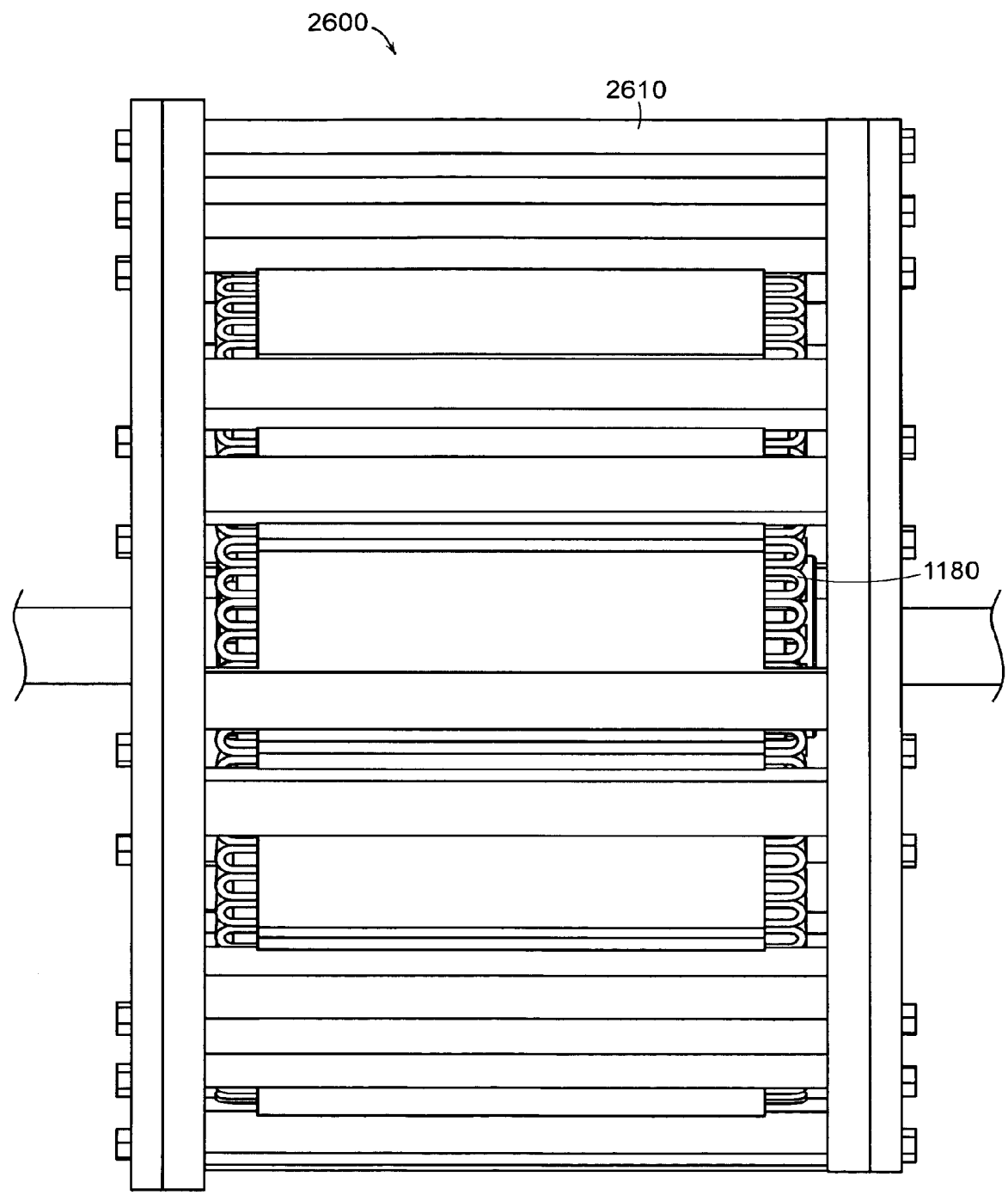

FIGS. 26a through 26d depict several views of one embodiment of the generator assembly 2600 of the present invention. These figures depict the rotor 1100 and stator 1180 assembled within a generator frame 2610. In this embodiment, FIGS. 26b and 26c depict the rotor 1100 being fastened to only one end plate 1140 and to only one end of the spider 1180 as evidenced by the fasteners present only in the end view of FIG. 26b. This configuration enables easy removal of the modular segments of the rotor 1100 and stator 1180.

Figure 27:
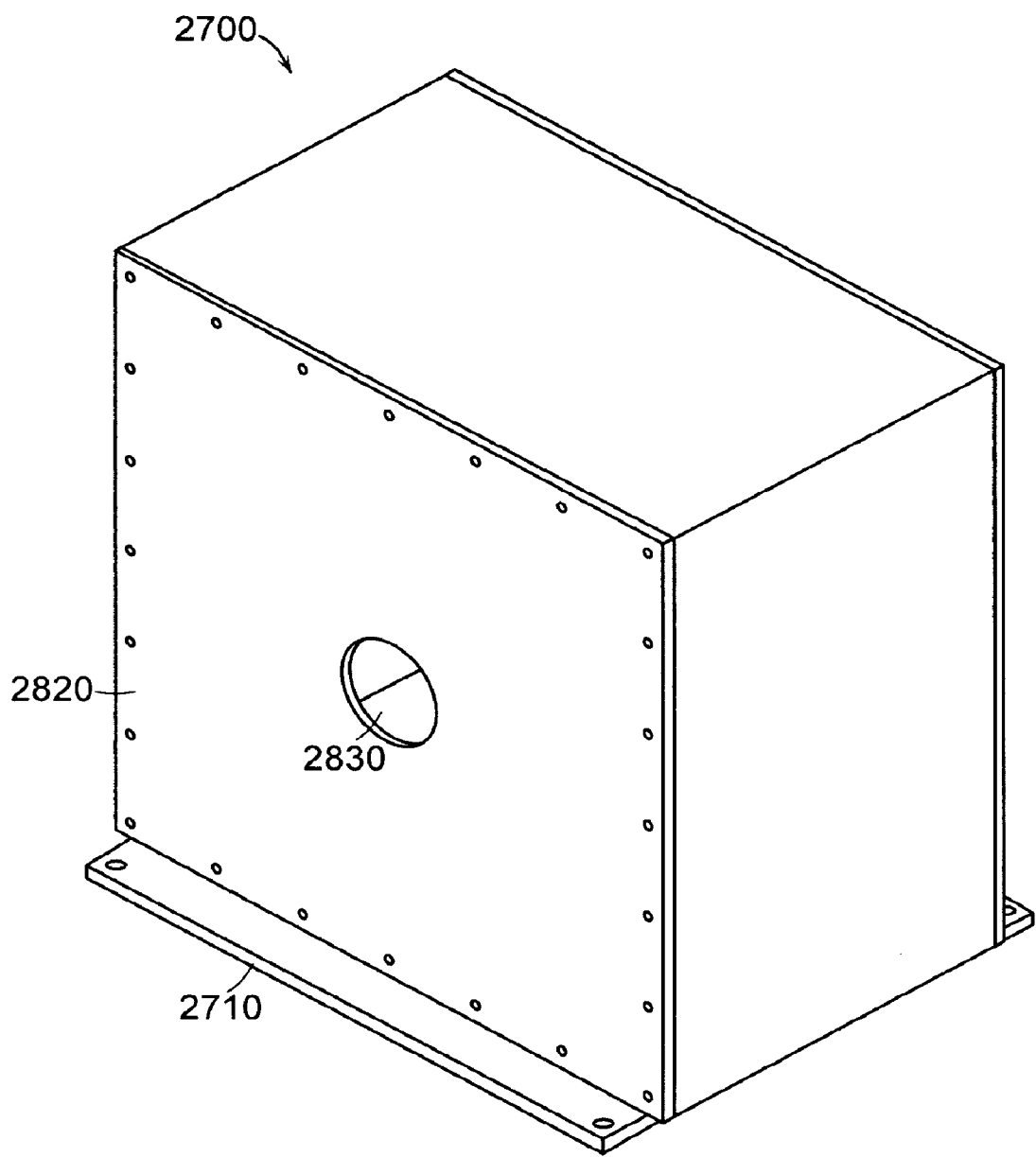
Figure 28:
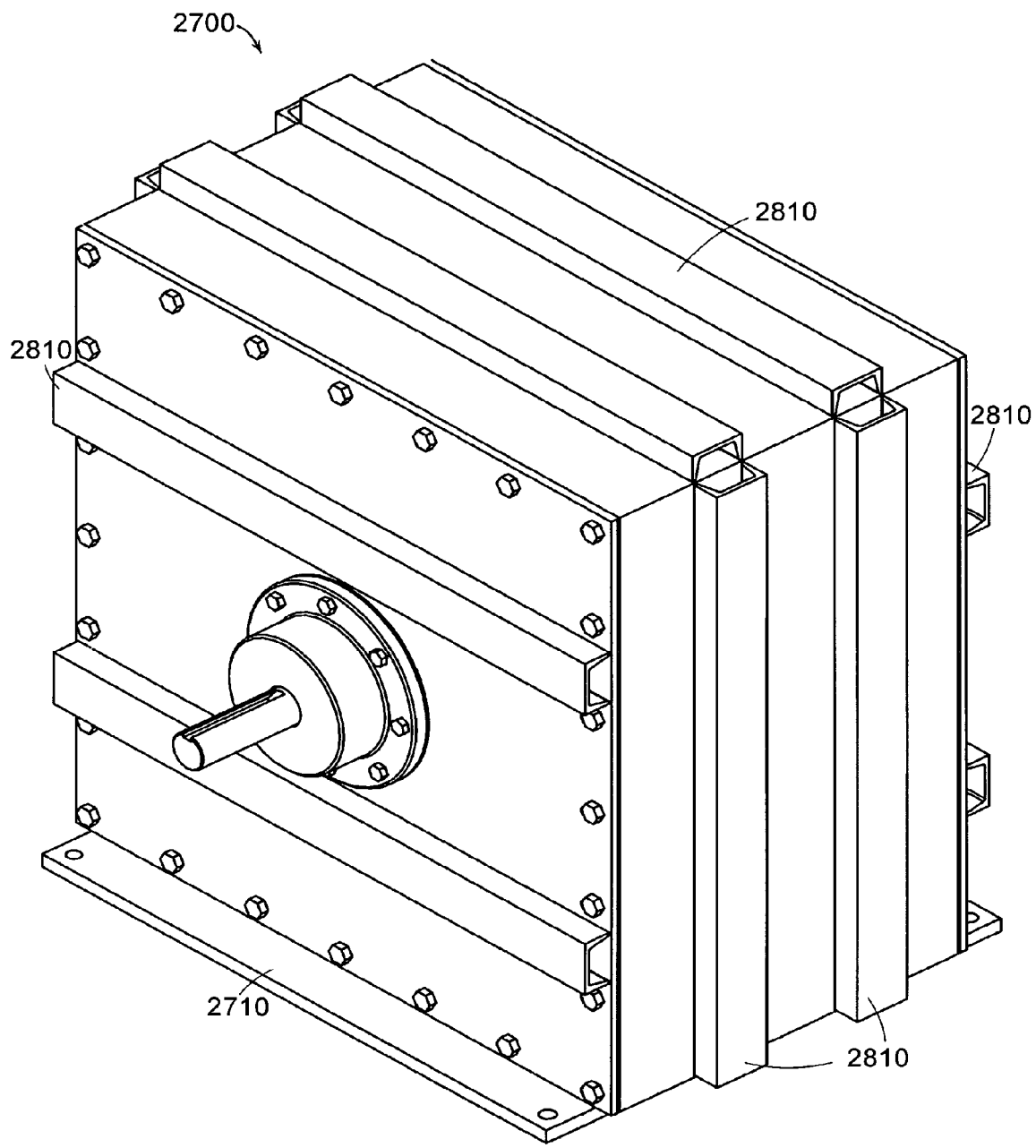
FIG. 28 depicts a perspective view of one embodiment of a housing assembly of the present invention.
Figure 29:
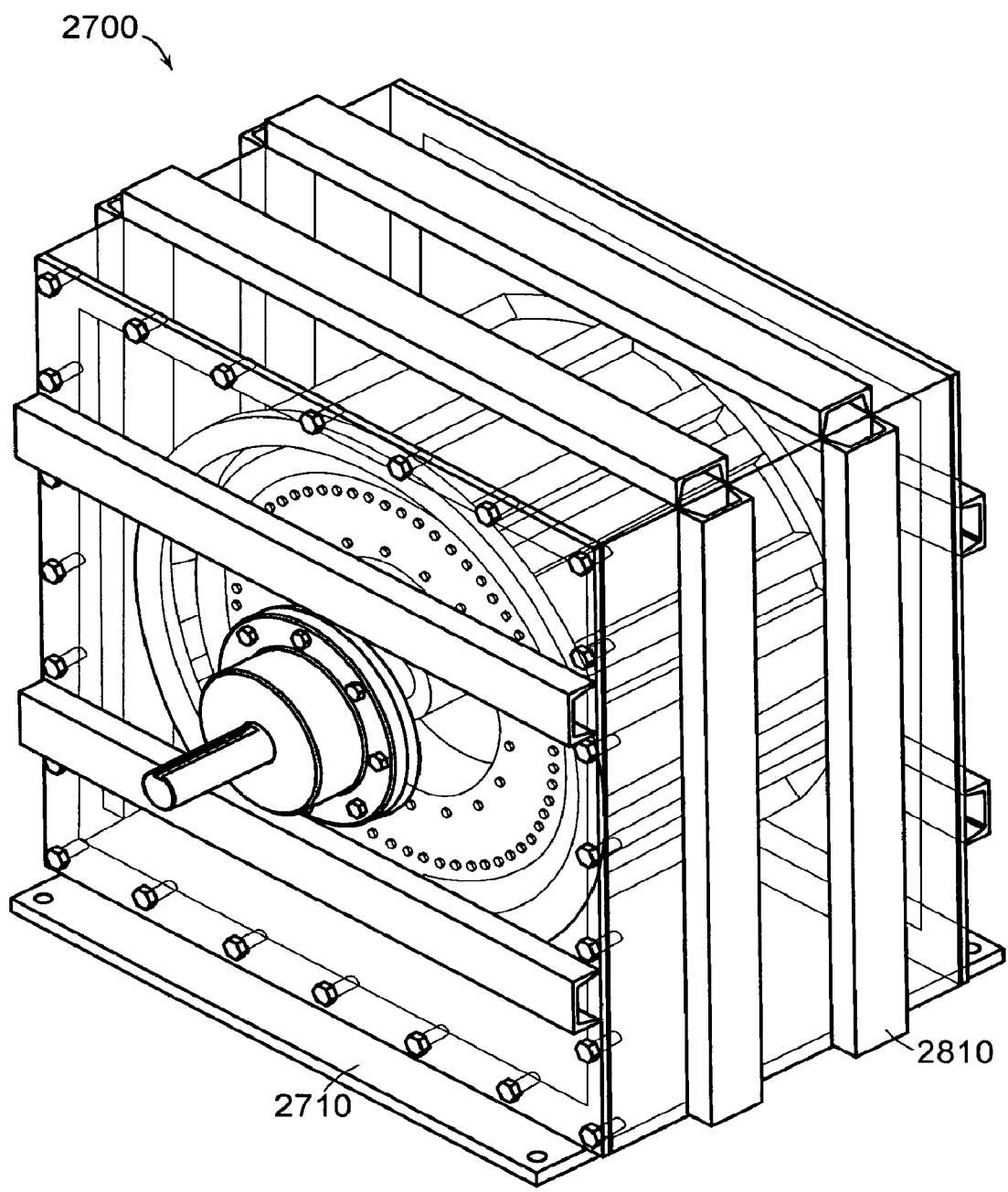
FIG. 29 depicts a see-through perspective view of one embodiment of a housing assembly of the present invention.
Figure 30:
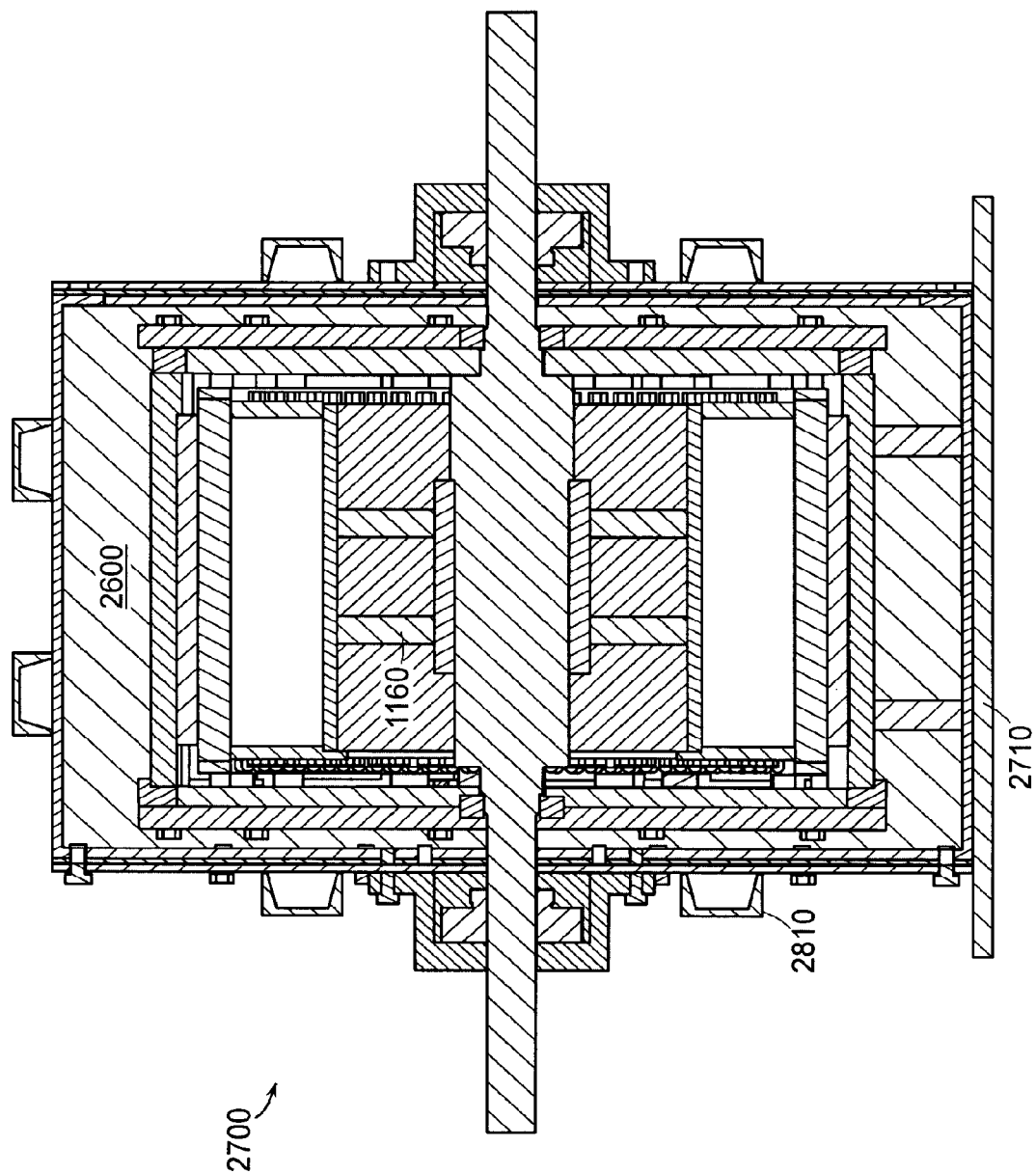
FIG. 30 depicts a cross section of one embodiment of a housing assembly of the present invention.
Figure 32:
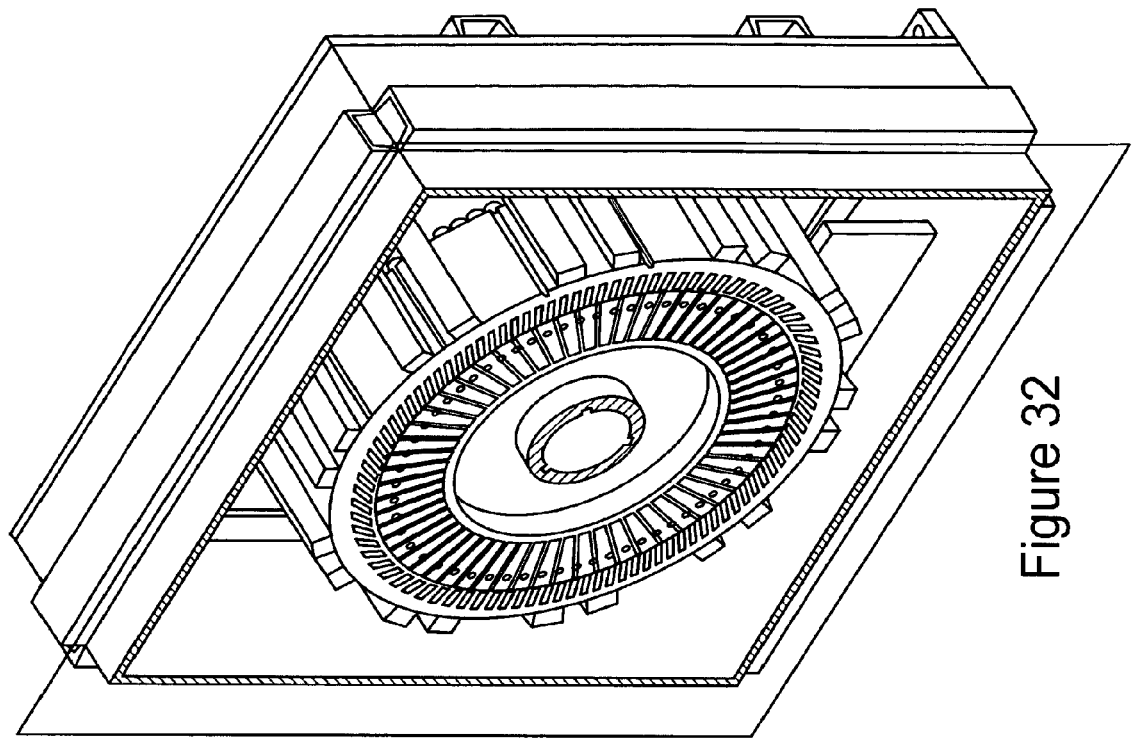
FIG. 32 depicts perspective view of a center cut cross section of one embodiment of a housing assembly of the present invention.

Once assembled, the complete generator 2600 is housed in a watertight housing 2700 depicted generally in FIG. 27 as square shaped. One skilled in the art will recognize that many other shapes are applicable. This embodiment of the housing 2700 has a mounting flange 2710 thereon for bolting to the support structure 410 of the submersible turbine-generator unit. The watertight housing 2700 may be manufactured from any impervious material durable enough to withstand the turbulent flow and high salinity of deployment waters. Preferably the housing 270 is manufactured from plate steel.

Turn to FIGS. 27 through 31, which depict the generator assembly 2600 as installed within the watertight housing 2700 in one embodiment of the present invention, the housing 2700 has thereon channels 2810 for reinforcement. Preferably, these channels are manufactured from steel to provide adequate rigidity to the housing 2700 to withstand forces of fast moving current.

Figure 31:
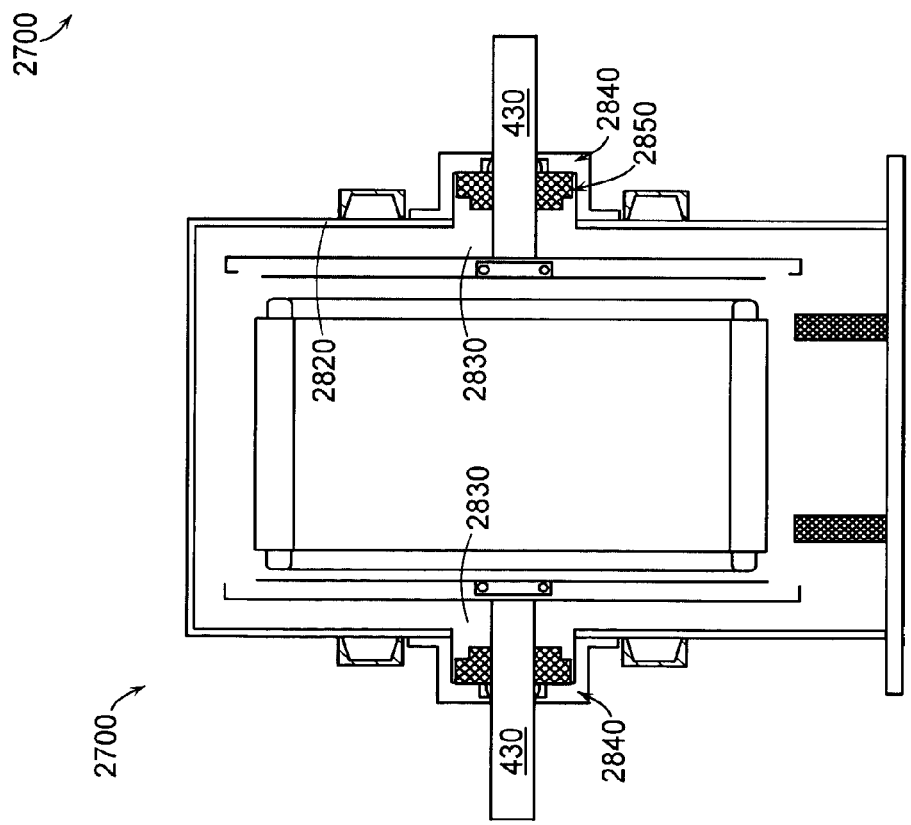
FIG. 31 depicts a schematic of a cross section of one embodiment of a housing assembly of the present invention.
Figure 33:
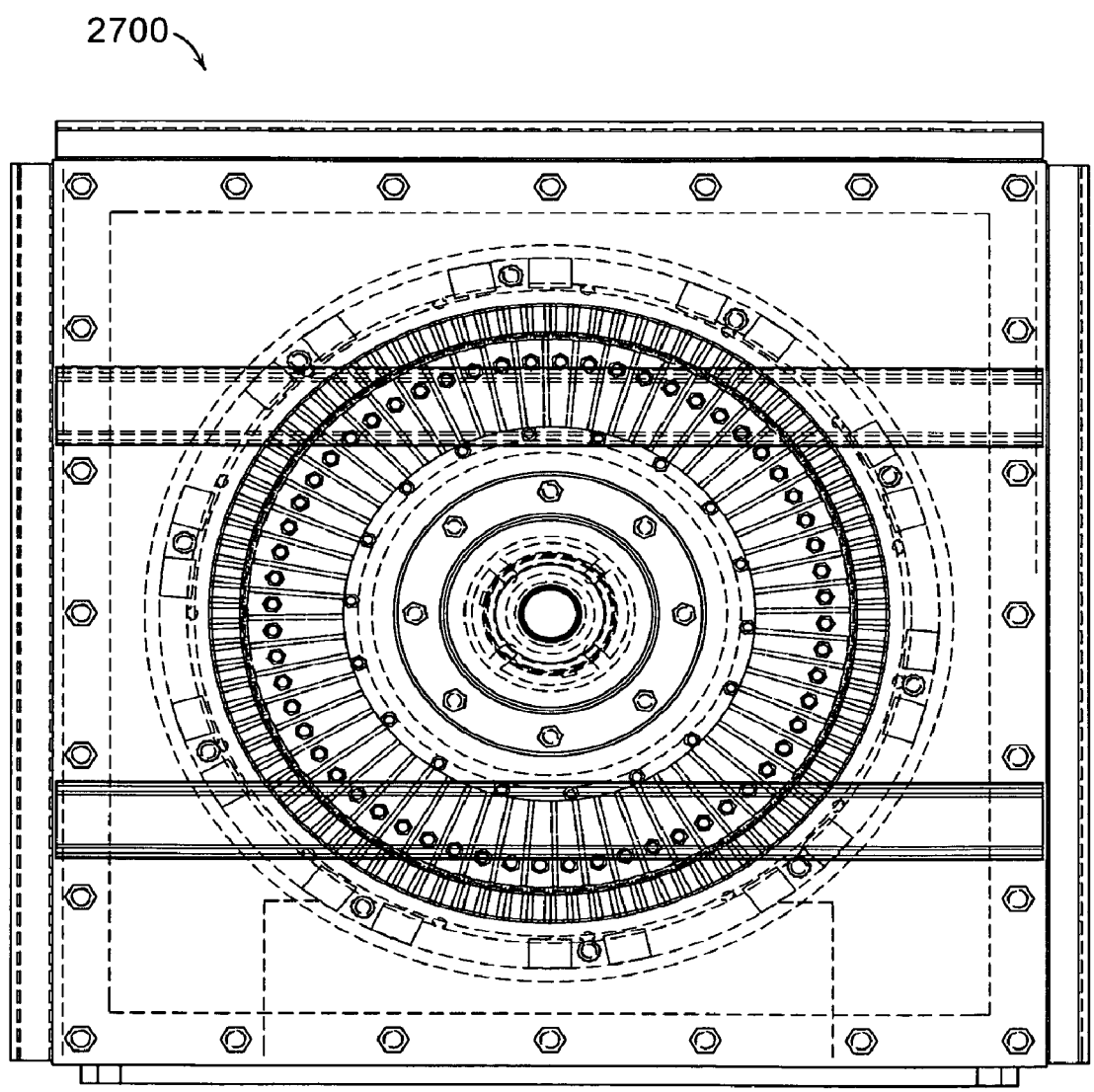
FIG. 33 depicts a schematic of a housing assembly of the present invention.
Figure 34:
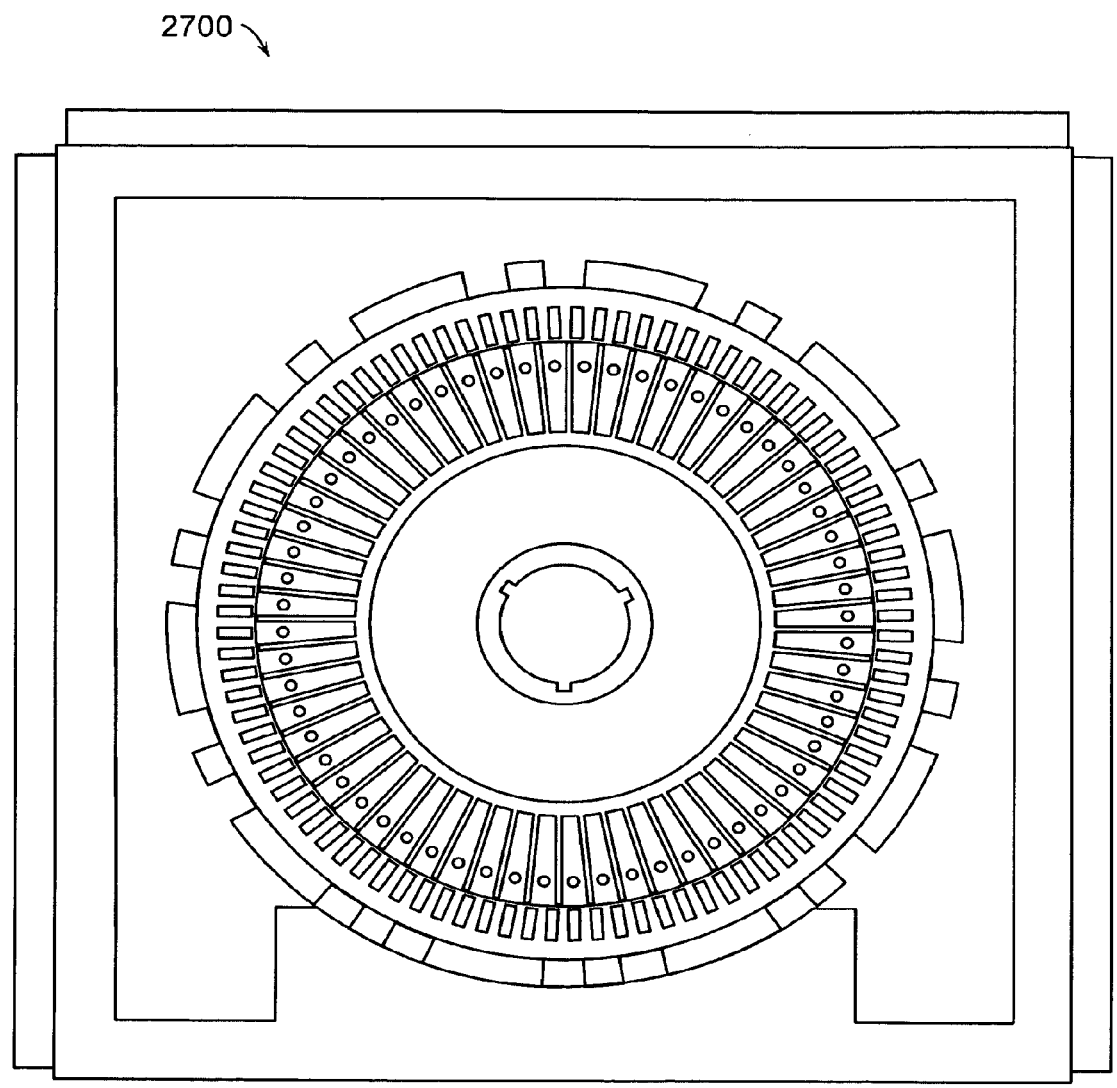
FIG. 34 depicts an end view of a center cut cross section of one embodiment of a housing assembly of the present invention.

Removable endcaps 2820 of the housing 2700 are securely fastened to the housing 2700 through watertight means. Such means may include adhesives, welding, and/or mechanical fasteners such as rivets or bolts optionally applied in conjunction with one or more watertight sealants or gaskets. As best depicted in FIGS. 27 and 31, either endcap 2820 includes an opening 2830 through which the shaft 430 of the generator 600 extends. Stuffing boxes 2840 are employed around each opening 2830 and sealed. In one embodiment, shown in FIG. 31, each stuffing box 2840 employs a seal 2850 at an interface with the housing 2700, here shown by way of example as a Chesterton® 180WB Cartridge Seal.

In one embodiment, each stuffing box 2840 mounts in a concentric pilot recess in a housing endcap 2820, and the housing endcaps 2840 are pin located to the housing 2700 for proper alignment. Each stuffing box 2840 has at least one radial access hole enabling tightening of setscrews on the seal 2850, which fits to the shaft 430. Centering clips (not shown) shipped with the seal 2850 are removable once the seal assembly is bolted to the stuffing box 2840 and before the entire stuffing box 2840 with seal 2850 therein is assembled to the housing 2700.

Rotor 1100 is what is referred to as a "focused flux" design with no circumferential skew with the rectangular magnets 1110 positioned radially between adjacent magnet poles 1120 with the flux from each magnet 1110 crossing the machine air gap twice.

The stator 1180 has been designed to use three slots per pole with the winding pitched full pitch with two coil sides per slot and with the secondary winding connected as series wye-connected. There are three (3) leads coming out of the machine—one for each of the three phases.

The stator core (i.e., each of the 10 stator segments 1185) is to be stacked on a stacking fixture which will result in a 1.10 Slot pitch stator circumferential skew for the purpose of minimizing magnetic cogging torque.

The operating speed of this subscale model generator 600 may be from 35 RPM to 100 RPM for testing purposes, which is the very same RPM as a full scale generator.

The following instructional description provides details of an exemplary procedure for manufacturing the stator core and winding according to one embodiment of the present invention:

Step 1—Using pieces of the afore described stator lamination segments 1185 (24GA, M-19, C-5), each being a 1/10th stator segment 1185 with 18 effective slots, stack a 9.00 inch high core segment (i.e., approximately 360 lamination pieces) on a fixture that results in a core skew of 1.10 slot pitch and secure the stacked segment using 3M Scotchcast adhesive.

Step 2—Make skeins of six (6) coils each (number of coils/phase in each of the ten stator segments 1185, where the coils consist of 12 turns of #12.5GA equivalent (stranded as necessary) with a coil pitch of 1 to 4 slots and with all six coils connected in series per skein. Note that the round magnet wire should be insulated with Class H, 200° C. rated wire film. The beginning segment with leads Phase A, Phase B Neutral and Phase C are to have leads using #10GA stranded lead wire and insulated with Class H rated materials.

Step 3—Fluid insulate the stator segment 1185 with Class H rated epoxy powder, being sure to mask the circumferential ends (i.e., 2 ends), the entire outer diameter surface and to within approximately ⅛ inch of the bottom of the slots such that only the slots and inner diameter of the stator segment 1185 receive a coating.

Step 4—Insert the eighteen coils into each of the ten stator segments 1185, leaving the one-half of the three coils that span across adjacent segments overhanging and provided with adequate lead length for finalizing electrical interconnections during assembly of the stator 1180.

Step 5—Impregnate each of the stator segments 1185 with the proper Class H electrical baking varnish with the exception of the three overhanging coil sides and bake in an oven.

Step 6—Assemble the ten (10) stator segments 1185 into the frame support structure using the dovetails provided in the inner diameter of the frame and the dovetails at the circumferential ends of each core segment, making sure that all ten segment core modules line up.

Step 7—Make the appropriate winding interconnections between the ten stator segments 1185 and secure the entire winding with the necessary tie-downs and place the leads (i.e., both neutrals and phase leads) appropriately.

Step 8—Using a good air-dry insulating varnish, impregnate those areas of winding interconnect and allow to dry.

Step 9—After the varnish has dried, test the winding (stator 1180) with a Hi-Pot at 2000 Volts minimum for one minute and preferably also test the stator 1180 with a surge test instrument to determine that all three phases are identical and properly connected.

Turning now to FIGS. 20 through 25, one or more submersible turbine-generator units 400 may be configured and installed on a single submersible power generation platform to create a combined submersible power generation module 2000. Because of the unique structural design of the submersible turbine-generator units 400, they may "stacked" on top of each other to create a power generation module with a large combined generating capacity. For example, units may combine to form a module that produces greater than 1 MW.

The submersible turbine-generator units 400 will operate below the surface of the water producing electrical energy that will transmit to shore via undersea electrical cables. This design creates no impact on view shed because no components will be visible above the water's surface. As an alternative to sending the electric energy to shore, the electrical generation systems could power production of hydrogen and/or potable water from sea water at an off-shore deep ocean site that could ship the hydrogen and/or potable water to any receiving terminal around the world.

A typical ocean current project may consist of multiple submersible power generation modules, each containing one or more submersible turbine generator units, deployed in an "array" or "school" in a fast-moving ocean current such as the Florida Current. These "arrays" may be interconnected to an on-shore utility substation through an underwater transmission line. Each module may consist of several submersible turbine-generator units integrated into a single, synchronized ocean current generation system. The module will comprise a submersible structural vessel that supports the submersible turbine-generator units 400 and provides buoyancy and stability, in addition to structurally supporting the modules.

Installers may position a submersible power generation module 2000 below the surface of the ocean and anchor the module to the ocean floor using a deep-water, multi-point mooring system. The module may rise to the water's surface and lower into position on command for installation and maintenance.

Figure 25:
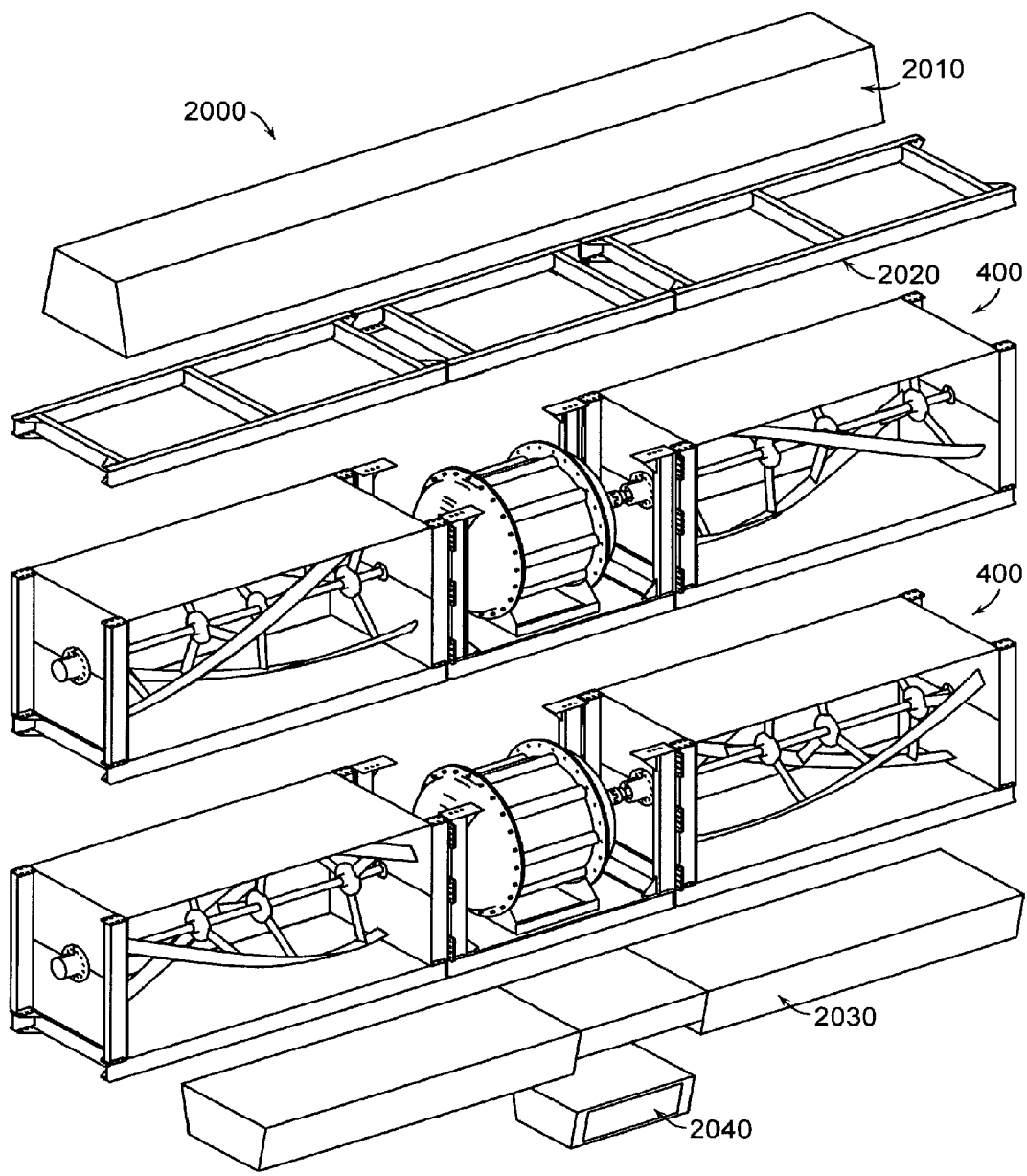
FIG. 25 depicts an exploded perspective view of another submersible turbine-generator module according to yet another embodiment of the present invention.

FIG. 25 depicts an exploded perspective view of one embodiment of the present invention particularly designed to facilitate raising and lowering the power generation module 2000. The embodiment shown includes a top ballast tank 2010, a ballast tank support frame 2020, submersible turbine generator units 400, a bottom ballast tank 2030 and a power electronics and control system unit 2040. At an on-shore assembly and deployment site, installers connect the submersible turbine-generator units 400 in a stacked configuration, such as the 2-unit horizontal assembly depicted here. The installers then attach the ballast tanks 2010, 2030 and the power electronics and control system unit 2040. Next, the installers connect the power and control leads from the submersible turbine-generator units 400 to the power electronics and control system unit 2040 and connect the underwater transmission line 2050, mooring lines 2060 and mooring anchors 2070 (shown in FIGS. 23 and 24).

Operators then tow the assembled power generation module 2000 to a deployment site and connect the mooring lines 2060, mooring anchors 2070, control cables (not shown) and transmission cables 2050 to the floor of the waterway. The operators then flood the bottom ballast tank 2030 and then the top ballast tank 2010 to lower the module into an operating position beneath the water surface 2080.

Each submersible power generation module connects electrically to an underwater electrical junction box using a dynamic (i.e., flexible) feeder transmission cable, which optionally may be incorporated into a mooring line. The electrical junction box then interconnects all of the submersible power generation modules 2000 in the array to a single underwater transmission line 2050 that connects with the on-shore utility substation.

The submersible power generation modules 2000 are positionable at optimal locations within current flow to most fully and efficiently utilize ocean current energy force and avoid interfering with commercial shipping and any other water surface activity. The horizontal configuration of the submersible turbine generator units 400 maximizes extraction efficiency because the velocity of ocean and tidal currents varies by depth; Very little variation occurs in the horizontal plane. For example, an optimal location for placing submersible power generation modules 2000 in the Florida current, this may be twelve (12) to twenty-five (25) miles from shore and fifty (50) meters below the surface of the water. In the event that a major permanent shift occurs in the "sweet spot" of the ocean's current, an operator easily may reposition the submersible power generation modules 2000. Additionally, the submersible turbine generator units 400 are adaptable for deployment in a vertical configuration. Such deployment is preferable in waterways having generally vertically uniform flow velocities which also may be largely unidirectional.

Using a state-of-the-art automation and control systems developed initially for use in wind turbines and other offshore energy devices, on-shore computers monitor and control the submersible power generation modules 2000. To facilitate initial deployment, inspection, maintenance, repair and replacement, one embodiment of the submersible power generation modules 2000 is designed to rise to the ocean surface with the turbine-generator units 400 oriented in a horizontal position and floating above the water's surface.

Submersible turbine-generator units 400 according to embodiments of the present invention operate effectively in areas where significant tidal flows create fast moving tidal currents, such as those in straits, estuaries, around islands and in other areas where significant tidal flows occur. Two key differences between ocean currents and tidal currents are: (1) tidal currents follow a sinusoidal curve with respect to speed and direction based on a lunar day; and (2) tidal currents occur in much shallower water than ocean currents.

As noted herein before, a typical tidal current project using submersible turbine-generator units 400 according to embodiments of the present invention may consist of multiple submersible power generation modules 2000 deployed in an "array" or "school" in fast-moving tidal currents, such as the Upper Cook Inlet. Applications of the present technology in tidal current applications may be much more site specific than ocean current applications because of particular site parameters requiring consideration. These parameters include maximum and minimum tidal current flows, width and depth of the waterway in which the submersible turbine-generator modules will be installed, geological conditions of the bottom of the waterway and ecological sensitivity. The basic design of embodiments of submersible power generation modules 2000 and component turbine generator units 400 applied in tidal currents similar to those modules 2000 deployed in ocean currents, but the sizing of the generator 600 and the power electronics may vary to accommodate the much higher variations in current speed within the tidal currents.

Submersible turbine-generator units 400 according to embodiments of the present invention mounted individually on a mounting platform or several of them may mount ("stack") on a submersible platform structure. The platforms may anchor to the bottom using a shallower mooring system similar to that of the ocean current platforms. Alternatively, the submersible turbine-generator units 2000 deployed in tidal waters may mounted directly to the bottom of the waterway using pilings or other appropriate foundation structure, such as other permanent structures that already exist (e.g., oil drilling platforms or piers). The dynamic electric cables, electric junction box and underwater transmission line deployed in the tidal water embodiments of the present invention also will be very similar the ocean current embodiments.

All of the modular components, equipment and materials for the submersible power generation modules 2000, including submersible turbine generator units 400, may ship unassembled to an on-shore assembly site in close proximity of a deployment site. The submersible power generation modules 2000 comprise a modular design such that on-site assembly time will minimal.

A study completed in late 2005 identified 30 different technology concepts designed to harness ocean, tidal and river water flows. Half of these concepts focused on wave energy, 30% on tidal or river flows, and the remaining 20% were aimed at harnessing open ocean currents.

In general, all of these identified technologies share similar disadvantageous characteristics as compared to the submersible turbine-generator units 400 according to embodiments of the present invention. The results of this study are summarized below:

High Complexity—Most of the proposed designs require electromechanical steering and control systems to achieve optimum orientation with changing water velocity and direction. Several rely on complex hydraulic systems to generate power from linear mechanical motion. Many also use mechanical gear boxes to obtain high generator speeds. These mechanisms all reduce system efficiency while affecting long term reliability. Certain projects also require massive foundations, support structures, and heavy lift mechanisms to site and service the generating units.

In contrast, the submersible turbine-generator units 400 of the present invention eliminate a need for steering mechanisms by using an omni-directional turbine that operates independent of flow direction or velocity. The submersible turbine-generator modules use a direct drive design and avoid the inefficiencies of a mechanical gearbox. Finally, the submersible turbine-generator modules utilize a simple mounting platform and mooring system based on well developed deep water anchoring practices.

Site Specific Design—Many of the tested technology concepts are highly integrated systems designed for specific site and flow conditions. They require redesign and/or reconfiguration for different locations. The present invention, by comparison, comprises a modular system enabling simple modifications in size and/or scale for use with different applications.

System Sizing—Based on the results of this study, and that of a separate 2005 study by EPRI for tidal application devices, the power levels proposed by competitive designs vary widely in terms of output magnitude. On one end of the spectrum are huge devices designed for megawatt output, while the other end of the market comprises designs having capacities in the low kilowatt range. The market potential for huge devices is limited by the number of locations with geography and power potential adequate to justify capital cost, while the smaller units require deployment in extreme numbers to achieve adequate magnitudes of cost effective power production.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A submersible turbine-generator unit for generating electricity from ocean or tidal currents, comprising:
   a. a generator;
   b. a shaft for driving said generator;
   c. two or more unidirectional turbines capable of rotation under reversible fluid flow, each of which is mounted on said shaft at either side of said generator such that the shaft, the two or more turbines and the generator are coaxial, wherein
      i. a removable shaft extension system is disposed along the shaft between the generator and the two or more turbines such that the generator is removable without requiring disassembly of the two or more unidirectional turbines and
      ii. no gears exist between the generator and the turbines; and
   d. a framework for supporting said generator, said shaft, said removable shaft extension system and said two or more turbines wherein
      i. the framework surrounds the two or more turbines in interconnected individual turbine chambers defining a fluid flow path across the turbine;
      ii. the rotatable shaft is transversely mounted through the interconnected turbine chambers;
      iii. at least one turbine blade support member is fixedly mounted to the rotatable shaft for rotation therewith in a plane perpendicular to said shaft axis;
      iv. the two or more turbines each comprise a plurality of turbine blades fixedly mounted to the at least one blade support member such that the plurality of turbine blades are oriented parallel to and radially spaced apart from the rotatable shaft; and
      v. each of the plurality of blades has an airfoil shape having a leading edge and a trailing edge and a chord there between, said airfoil shape oriented transversely to said flow path with said chord lying generally along a circular rotation path, so that each of the plurality of blades is oriented for rotation along said rotation path in a plane parallel to said flow path in the direction of said leading edge.

2. The unit according to claim 1, further comprising a support structure adapted for safe navigation upon the water and submersion and surfacing within the ocean or tidal currents.

3. The unit according to claim 2, wherein said support structure further comprises one or more ballast tanks and means for flooding and blowing said ballast tanks.

4. The unit according to claim 1, further comprising means for mooring said module within a flow of the ocean or tidal currents.

5. The unit of claim 4, further comprising a plurality of submersible turbine-generator units, each of which is separately coupled to said mooring means.

6. The unit of claim 5, further comprising a plurality of submersible turbine-generator units, which are arrayed together and coupled to said mooring means.

7. The system according to claim 5, further comprising a plurality of submersible turbine-generator units forming a plurality of arrays of said submersible turbine-generator units, each said array being separately coupled to said mooring means.

8. The unit according to claim 1, further comprising means for transmitting electricity generated by said generator to shore.

9. The unit according to claim 1, further comprising means for storing electricity generated by said generator.

10. The unit according to claim 1, further comprising means for generating and storing by-products of the electricity generated by said generator.

11. The unit according to claim 10, wherein said by-products comprise hydrogen.

12. The unit according to claim 10, wherein said by-products comprise potable water.

13. The unit according to claim 1, wherein said turbine chamber has a curved configuration having opposite elevations in the plane parallel to said flow path, said elevations being offset in a direction of rotation of said leading edge to rotatably channel fluid in said flow path and to direct fluid flow to said plurality of blades with a radial component of flow relative to said blades.

14. The unit of claim 1, wherein said generator comprises:
a plurality of stator segments;
a plurality of rotor segments;
wherein said plurality of stator segments and said plurality of rotor segments are adapted for modular assembly.

15. The unit of claim 14, wherein one or more of the plurality of stator segments and/or rotor segments are selectively replaceable.

16. The unit of claim 14, further comprising a watertight housing having one or more removable endcaps.

17. The unit of claim 14, further comprising a stuffing box for sealing a shaft-endcap intersection.

\* \* \* \* \*